(12) United States Patent
Aono

(10) Patent No.: US 10,545,600 B2
(45) Date of Patent: Jan. 28, 2020

(54) TACTILE SENSATION PROVIDING APPARATUS AND CONTROL METHOD FOR TACTILE SENSATION PROVIDING APPARATUS

(75) Inventor: Tomotake Aono, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 93 days.

(21) Appl. No.: 13/807,661

(22) PCT Filed: May 11, 2011

(86) PCT No.: PCT/JP2011/002620
§ 371 (c)(1),
(2), (4) Date: Dec. 28, 2012

(87) PCT Pub. No.: WO2012/001859
PCT Pub. Date: Jan. 5, 2012

(65) Prior Publication Data
US 2013/0113747 A1   May 9, 2013

(30) Foreign Application Priority Data

Jun. 30, 2010 (JP) ................. 2010-149641

(51) Int. Cl.
*G06F 3/041* (2006.01)
*G06F 3/01* (2006.01)

(52) U.S. Cl.
CPC ............ *G06F 3/0416* (2013.01); *G06F 3/016* (2013.01); *G06F 3/0414* (2013.01)

(58) Field of Classification Search
CPC ...... G06F 3/04842; G06F 3/041; G06F 3/044; G06F 3/0488; G06F 3/0416
See application file for complete search history.

(56) References Cited

U.S. PATENT DOCUMENTS 7,205,978 B2   4/2007   Poupyrev et al.
7,292,227 B2   11/2007  Fukumoto et al.
(Continued)

FOREIGN PATENT DOCUMENTS

CN   1392977 A   1/2003
CN   1255710 C   5/2006
(Continued)

OTHER PUBLICATIONS

The Korean Office Action "Notice of Grounds for Rejection" dated May 13, 2013, which corresponds to Korean Patent Application No. 10-2012-7002480 and is related to U.S. Appl. No. 13/387,712 with translation.
An Office Action issued by the Korean Patent Office dated Oct. 31, 2013, which corresponds to Korean Patent Application No. 2012-7002480 and is related to U.S. Appl. No. 13/807,661.
An Office Action; "Notice of Reason for Rejection," issued by the Japanese Patent Office dated Oct. 1, 2013, which corresponds to Japanese Patent Application No. 2010-149641 and is related to U.S. Appl. No. 13/387,712; with concise explanation.
(Continued)

*Primary Examiner* — Lixi C Simpson
(74) *Attorney, Agent, or Firm* — Studebake & Brackett PC

(57) ABSTRACT

A tactile sensation providing apparatus includes a touch sensor 11 configured to receive an input, a load detection unit 12 configured to detect a pressure load on a touch face 11a of the touch sensor 11, a tactile sensation providing unit 13 configured to vibrate the touch face 11a, a memory unit 15 configured to store drive signal information for the tactile sensation providing unit 13, and a control unit 16 configured, when the pressure load detected by the load detection unit 12 satisfies a standard for providing a tactile sensation, to retrieve the drive signal information from the memory unit 15 and to control drive of the tactile sensation providing unit 13 based on the drive signal information such that a button depression sensation is provided one time to a pressing object pressing the touch face 11a.

16 Claims, 22 Drawing Sheets

(56) References Cited

U.S. PATENT DOCUMENTS

| | | | |
|---|---|---|---|
| 7,683,889 | B2 | 3/2010 | Rimas Ribikauskas et al. |
| 7,755,607 | B2 | 7/2010 | Poupyrev et al. |
| 2002/0149561 | A1 | 10/2002 | Fukumoto et al. |
| 2004/0095310 | A1 | 5/2004 | Gregorio et al. |
| 2005/0156904 | A1 | 7/2005 | Katayose |
| 2006/0109256 | A1 | 5/2006 | Grant et al. |
| 2008/0024459 | A1* | 1/2008 | Poupyrev ............... G06F 3/016 345/173 |
| 2008/0158152 | A1 | 7/2008 | Parker |
| 2010/0156818 | A1* | 6/2010 | Burrough et al. ............ 345/173 |
| 2010/0231539 | A1* | 9/2010 | Cruz-Hernandez et al. ................ 345/173 |
| 2010/0231550 | A1* | 9/2010 | Cruz-Hernandez et al. ................ 345/174 |
| 2011/0037706 | A1* | 2/2011 | Pasquero ............... G06F 3/016 345/173 |
| 2011/0084912 | A1* | 4/2011 | Almalki ................ G06F 3/041 345/173 |
| 2011/0102355 | A1 | 5/2011 | Aono et al. |
| 2011/0102358 | A1 | 5/2011 | Aono et al. |
| 2011/0157052 | A1* | 6/2011 | Lee ....................... G06F 1/1626 345/173 |
| 2011/0279381 | A1* | 11/2011 | Tong ....................... G06F 3/016 345/173 |

FOREIGN PATENT DOCUMENTS

| | | |
|---|---|---|
| CN | 1808360 A | 7/2006 |
| CN | 101118469 A | 2/2008 |
| CN | 101211244 A | 7/2008 |
| JP | 2003-288158 A | 10/2003 |
| JP | 2005-190290 A | 7/2005 |
| JP | 2005-258666 A | 9/2005 |
| JP | 2005-332063 A | 12/2005 |
| JP | 2006-195734 A | 7/2006 |
| JP | 2008-130055 A | 6/2008 |
| JP | 2010-146507 A | 7/2010 |
| JP | 2010-146510 A | 7/2010 |
| KR | 10-2002-0037771 A | 5/2002 |
| KR | 10-2009-0006737 A | 1/2009 |
| TW | 201017491 A | 5/2010 |
| WO | 02/12991 A1 | 2/2002 |

OTHER PUBLICATIONS

Japanese Office Action; JP2009-177069; dated Jan. 17, 2012 with translation.

International Search Report; PCT/JP2011/002620; dated Jun. 7, 2011.

Japanese Office Action "Notification of Reason for Refusal" dated Jan. 22, 2013, which corresponds to JP Application No. 2010-288806 and is related to U.S. Appl. No. 13/387,712 with translation.

The extended European Search Report dated Dec. 18, 2012, which corresponds to EP Application No. 10804123.7-2224 / 2461236 PCT/JP2010004801 and is related to U.S. Appl. No. 13/387,712.

"Notification of the first Office Action" issued by the State Intellectual Property Office of China dated Dec. 26, 2013, which corresponds to Chinese Patent Application No. 201080033886.X and is related to U.S. Appl. No. 13/387,712; with English language translation.

An Office Action; "Communication pursuant to Article 94(3) EPC," issued by the European Patent Office dated Jun. 18, 2014, which corresponds to European Patent Application No. 10 804 123.7-1954 and is related to U.S. Appl. No. 13/807,661 and U.S. Appl. No. 13/387,712.

An Office Action; "Decision of Rejection," issued by the Japanese Patent Office dated May 7, 2014, which corresponds to Japanese Patent Application No. 2010-149641 and is related to U.S. Appl. No. 13/387,712 and U.S. Appl. No. 13/807,661; with English language concise explanation.

"Notification of the Second Office Action," issued by the State Intellectual Property Office of China dated Aug. 15, 2014, which corresponds to Chinese Patent Application No. 201080033886.X and is related to U.S. Appl. No. 13/387,712 and U.S. Appl. No. 13/807,661; with English language translation.

TW Office Action dated May 10, 2017, from corresponding TW Appl No. 100120408, with English statement of relevance, 4 pp.

U.S. Office Action dated Apr. 5, 2017 from corresponding U.S. Appl No. 13/387,712, 15 pp.

Office Action issued by the U.S. Patent and Trademark Office dated Aug. 9, 2017, which corresponds to U.S. Appl. No. 13/387,712 and is related to U.S. Appl. No. 13/807,661.

The Taiwanese Office Action dated Oct. 28, 2013, which corresponds to Taiwanese Patent Application No. 100120408 and is related to U.S. Appl. No. 13/807,661; with English language concise explanation.

* cited by examiner

FIG. 6
(a)
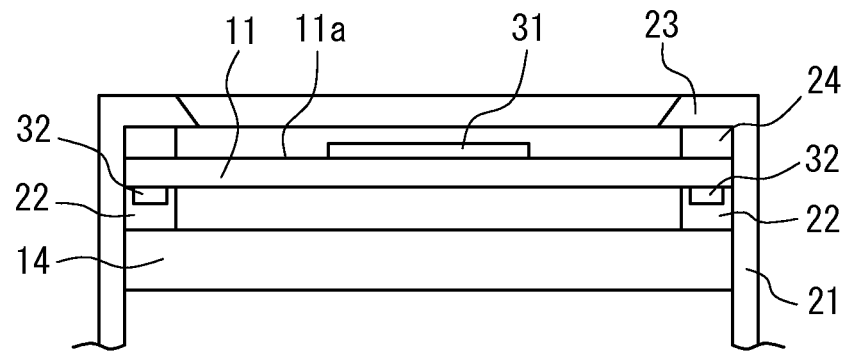
(b)
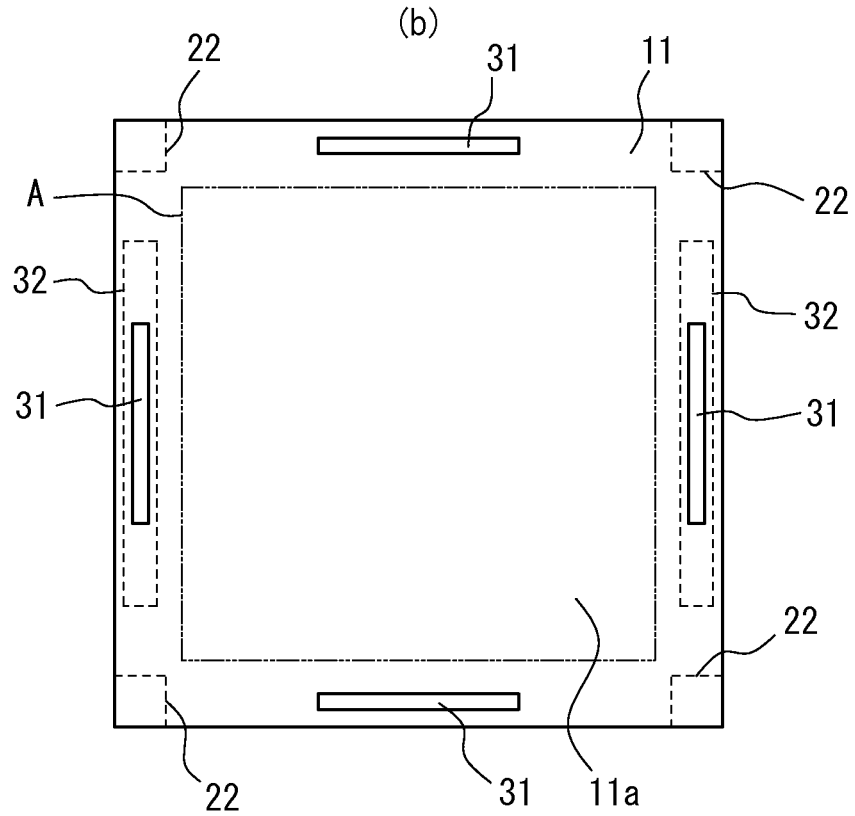

TACTILE SENSATION PROVIDING APPARATUS AND CONTROL METHOD FOR TACTILE SENSATION PROVIDING APPARATUS

CROSS REFERENCE TO RELATED APPLICATION

This application claims priority to and the benefit of Japanese Patent Application No. 2010-149641 filed on Jun. 30, 2010, the entire contents of which are incorporated herein by reference.

TECHNICAL FIELD

The present invention relates to a tactile sensation providing apparatus having a touch sensor and a control method for the tactile sensation providing apparatus.

BACKGROUND ART

In recent years, input apparatuses having touch sensors such as touch panels, touch switches or the like are popularly used as input apparatuses such as operation units, switches and the like for receiving input operations by a user in mobile terminals such as mobile phones and gaming machines, information equipments such as calculator, ticket vending machines, home electric appliances such as microwaves, TV sets, lighting equipments, industrial equipments (FA equipments) and the like.

There are known a variety of types of those touch sensors, such as a resistive film type, a capacitive type, an optical type and the like. However, touch sensors of these types receive a touch input by a finger or a stylus pen and, unlike push-button switches, the touch sensors themselves are not physically displaced even when being touched.

Since the touch sensors are not physically displaced when touched, an operator cannot obtain feedback to an input even when the touch input is received. As a result, the operator is likely to input erroneously by touching the same spot multiple times, which may be stressful for the operator.

As methods to prevent such repetitious inputs, there are known methods of visually or auditory confirming the input operations by, for example, generating sounds or by changing a display state, such as colors of input objects such as input buttons and the like graphically depicted on a display unit, according to an input position upon reception of the touch input.

As methods to prevent such repetitious inputs, there are known methods of visually or auditory confirming the input operations by, for example, generating sounds or by changing a display state, such as colors of input objects such as input buttons and the like graphically depicted on a display unit, according to an input position upon reception of the touch input.

There is also suggested a feedback method relying on neither the auditory—nor visual sensation but instead generating a tactile sensation at operator's fingertip by vibrating the touch sensor when the touch sensor receives an input (for example, see Patent Documents 1, 2).

RELATED ART DOCUMENTS

Patent Documents

Patent Document 1: Japanese Patent Laid-Open No. 2003-288158

Patent Document 2: Japanese Patent Laid-Open No. 2008-130055

SUMMARY OF INVENTION

Technical Problem

The techniques disclosed in the above Patent Documents 1, 2, however, merely generate the tactile sensation by vibration at the operator's fingertip. That is, the techniques merely provide a "throbbing" sensation at the operator's fingertip touching a touch face by vibrating the touch sensor.

These apparatuses have button switches such as, for example, push-button switches (push-type button switches) graphically depicted on the touch sensor and, even though the operator operates (pushes) the push-button switches (push-type button switches) intending to push, provide the "throbbing" sensation.

Therefore, although the operator pushes (operates intending to push) the push-type button switches, the operator will not be able to feel a button depression sensation obtained when pushing the push-type button switch. Note that, in the present specification, the "button depression sensation" is referred to as a "click sensation" unless otherwise specified.

As a result, especially when the button switches such as the push-button switches (push-type button switches) are graphically depicted on the touch sensor and a threshold for receiving an input to the touch sensor is low, the tactile sensation is provided when the finger or the like lightly contacts (touches) the touch sensor. It may trigger erroneous operations by responding to an unintentional motion (touch) before the operator pushes and inflict a feeling of strangeness to the operator upon the unintentional motion (touch). Here, the threshold for the touch sensor to receive a touch input is a threshold at which the touch sensor responds, which is, for a touch sensor of the resistive film type, a threshold of a pressure at which an upper conductive film is contacted to a lower conductive film and, for a touch sensor of the capacitive type, a threshold for detection of an electric signal by contact.

Accordingly, an object of the present invention in consideration of such conditions is to provide a tactile sensation providing apparatus capable of providing the realistic click sensation of button depression, similar to that obtained when the push-button switch is operated, upon operation of the touch sensor by the operator, and a control method for the tactile sensation providing apparatus.

Solution to Problem

In order to achieve the above object, a tactile sensation providing apparatus according to a first aspect of the present invention includes:

a touch sensor configured to receive an input;

a load detection unit configured to detect a pressure load on a touch face of the touch sensor;

a tactile sensation providing unit configured to vibrate the touch face;

a memory unit configured to store drive signal information for the tactile sensation providing unit; and a control unit configured, when the pressure load detected by the load detection unit satisfies a standard for providing a tactile sensation, to retrieve the drive signal information from the memory unit and to control drive of the tactile sensation providing unit based on the drive signal information such that a button depression sensation is provided one time to a pressing object pressing the touch face.

Further, in order to achieve the above object, a control method for a tactile sensation providing apparatus according to a second aspect of the present invention including a touch sensor configured to receive an input;

a load detection unit configured to detect a pressure load on a touch face of the touch sensor;

a tactile sensation providing unit configured to vibrate the touch face; and a memory unit configured to store drive signal information for the tactile sensation providing unit, includes:

a step, when the pressure load detected by the load detection unit satisfies a standard for providing a tactile sensation, to retrieve the drive signal information from the memory unit and to control drive of the tactile sensation providing unit based on the drive signal information such that a button depression sensation is provided one time to a pressing object pressing the touch face.

Effect of the Invention

According to the present invention, when the pressure load on the touch sensor satisfies the standard for providing the tactile sensation, the touch face of the touch sensor is vibrated such that a realistic click sensation of button depression, similar to that obtained when operating a push button switch, is provided to an operator.

BRIEF DESCRIPTION OF DRAWINGS

FIG. 6(a) and (b) illustrate an exemplary implementation structure of the tactile sensation providing apparatus illustrated in FIG. 5;

DESCRIPTION OF EMBODIMENTS

Prior to descriptions of embodiments of the present invention, a method for providing a click sensation employed by a tactile sensation providing apparatus according to the present invention will be described.

The method for providing the click sensation described below was found out in joint research by members including inventors of the present invention. The applicant has already suggested an input apparatus based on the method (for example, see Japanese Patent Application No. 2008-326281).

For sensory awareness, a human has a nerve responsible for a pressure sense to feel a pressure, such as hardness or softness of an object, from a load introduced to a bone and a muscle when touching the object and another nerve responsible for a tactile sense to feel a texture and the like of the object by detecting a vibration introduced to a skin surface when touching the object. That is, the pressure sense detects the load, and the tactile sense detects the vibration. Generally, a tactile sensation is a combination of the pressure sense and the tactile sense. Accordingly, reproduction of stimuli to the "pressure sense" and the "tactile sense" obtained when operating a push-button switch on a touch face of a touch sensor enables to provide a button depression sensation, that is, a click sensation to an operator.

On the other hand, as the push-button switches used for information equipments and home electric appliances, metal dome switches, emboss switches, rubber switches, tactile switches and the like, for example, are widely known. Although load characteristics of such common push-button switches may be different in a stroke of a push-button and an applied load (pressing force) among the switches of different types, those push-button switches basically have a load characteristics illustrated in FIG. 1.

Figure 1:
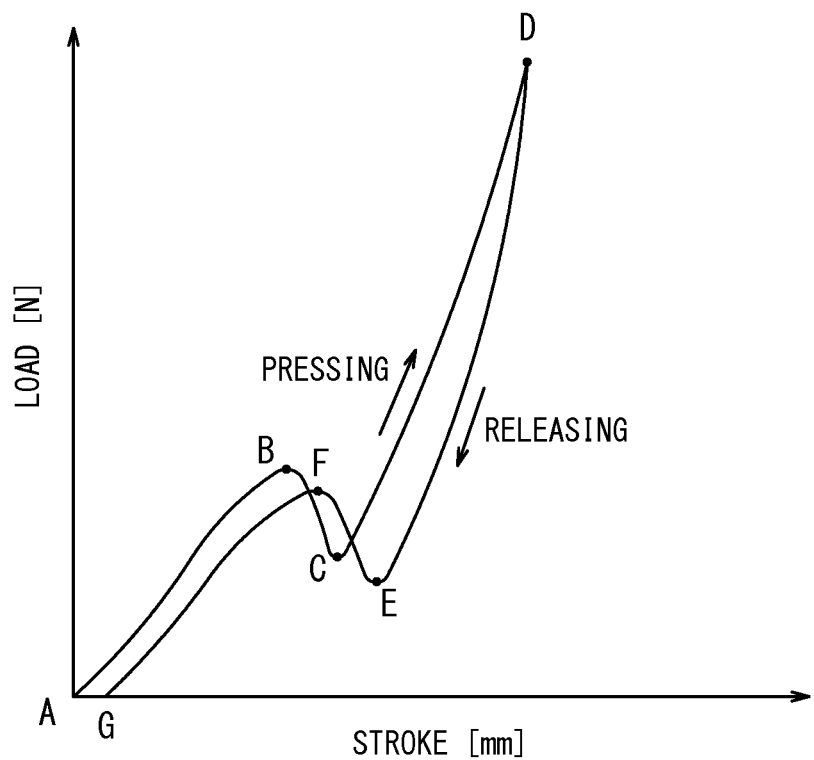
FIG. 1 is a diagram illustrating a general loading characteristic of a push-button switch.

The load characteristics in pressing illustrated in FIG. 1 has a period from a point A to a point B in which the load is increased substantially in proportion to a pressing-down level from when the push button starts being pressed down. In a period from the point B to a point C, a convex elastic member such as the metal dome is depressed as the push button is pressed down and the load dramatically decreases. In a period from the point C to a point D, a contact point of the switch closes and the load increases substantially in proportion to the pressing-down level.

Although there is a hysteresis to some degrees, the load characteristics of the push button in releasing retrace a change of the load in pressing. That is, in a period from the point D to a point E, the load decreases in substantially proportion to the pressing-down level from a start of releasing and the contact point of the switch remains closed. In a period from the point E to a point F, the elastic member restores a convex form from a depressed form due to release of the push button and the load dramatically increases. When this period starts, the contact point of the switch opens. A period from the point F to a point G represents a period before a finger is released from the push button after restoration of the form of the elastic member, and the load decreases in substantially proportion to the pressing-down level.

In the load characteristics illustrated in FIG. 1, a maximum stroke of the push button is very subtle; for example, 1 mm or less for the metal dome switch, the emboss switch and the tactile switch and 3 mm or less for the rubber switch. Also, loads on the metal dome switch, the emboss switch and the tactile switch at the point B are, for example, around 1 N to 6 N and the load on the rubber switch is, for example, around 0.5 N. The operator may obtain the click sensation when operating any of those push-button switches.

As such, the researchers studied what kind of movement of the push-button switch provides the click sensation generated by the "pressure sense" and the "tactile sense". First, the researchers studied which one of a change in the stroke and by a change in the pressure load causes the click sensation.

Figure 2:
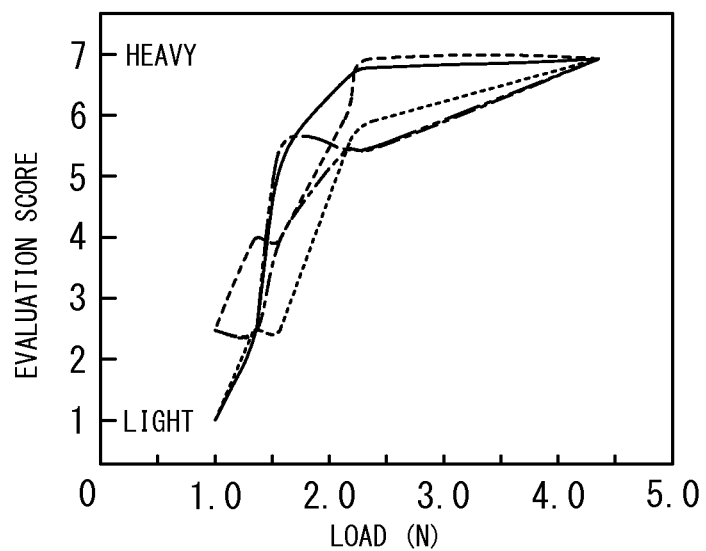
FIG. 2 is a diagram illustrating a result of a sensory evaluation on operations of a variety of push-button switches with different pressure loads.

FIG. 2 is a diagram illustrating a result of a sensory evaluation on a feeling of the operators when operating a variety of push-button switches with different pressure loads. A horizontal axis represents an actual pressure load and a vertical axis represents how the operators felt about the push-button switches, heavy or light, on a scale of 1 to 7. Subjects as the operators are five people who are accustomed to usage of mobile terminals. As can be seen in FIG. 2, these people may percept that the push-button switches with high pressure loads are heavy and the push-button switches with low pressure loads are light.

Figure 3:
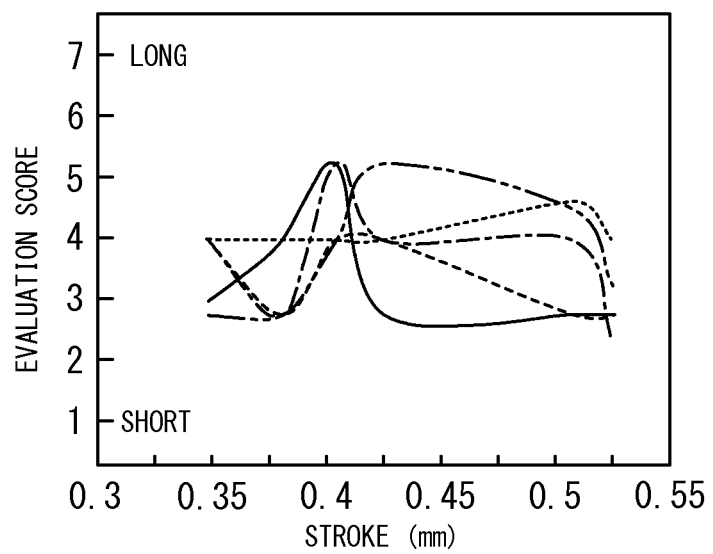
FIG. 3 is a diagram illustrating a result of a sensory evaluation on operations of a variety of push-button switches with different strokes.

FIG. 3 is a diagram illustrating a result of a sensory evaluation on the feeling of the operators felt when operating a variety of push-button switches with different strokes. The horizontal axis represents an actual stroke and the vertical axis represents how the operators felt about the stroke of the push-button switches, long or short, on the scale of 1 to 7. Subjects as the operators are five people the same as those in FIG. 2 who are accustomed to usage of the mobile terminals. As can be seen in FIG. 3, these people may not clearly percept whether a subtle stroke is long or short.

The result of the sensory evaluation described above indicates that the human may percept a difference in the loads but not a difference in subtle strokes.

As such, the above researchers focused on the change in the pressure load. That is, since the human may not percept the difference in the stroke, the researchers studied whether the human may obtain the click sensation when the pressure load on a plane such as the touch sensor, that is, when a stimulus to the pressure sense is changed as indicated by the points A, B and C in FIG. 1. Accordingly, an experimental apparatus having a plate that may move in a vertical direction was prepared, and the plate was pressed down from the point A to the point B illustrated in FIG. 1 and, on the moment when the load reached the point B, momentarily displaced slightly downward, in order to reproduce the change in the load between the points B and C.

As a result, although a "sense of pressing" to "have pressed down" the push-button switch was obtained, the realistic click sensation obtained when operating the metal dome switch, for example, was not obtained. That is, it was found out that there is another element, which may not be cleared by a relationship between the stroke and the load, necessary to obtain the realistic click sensation.

As such, the above researchers next studied focusing not only on the "pressure sense" but also the "tactile sense", which is another sensibility. Accordingly, by using a variety of mobile terminals having the input apparatus with the push-button switches of the metal dome switches mounted thereon, the above researchers measured vibrations generated at the push buttons when the push buttons were operated. As a result, it was found out that, at a point when the pressure load reaches the point B in FIG. 1, that is, at a point when the metal dome starts being depressed, the push button vibrates at a frequency of approximately 100-200 Hz.

Figure 4:
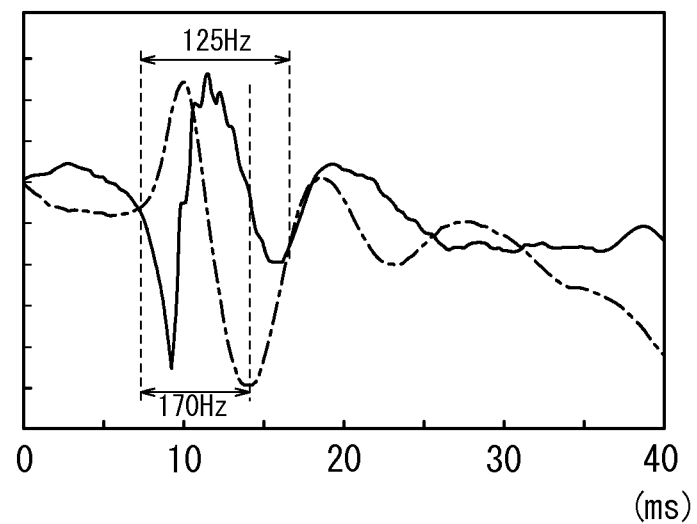
FIG. 4 is a diagram illustrating an example of a result of a measurement of a vibration generated at a push button in operation of the push-button switch.

FIG. 4 is a diagram illustrating an example of a result of a measurement of the above case. The horizontal axis represents an elapsed time of pressing and the vertical axis represents vibration amplitude. This push-button switch vibrated as indicated by a solid line in FIG. 4 at the point B in FIG. 1. Thereby, it was found out that the human receives 1 cycle of vibration stimulus for approximately 6 ms (a frequency of approximately 170 Hz) when pressing this push-button switch. Also, at a point when the pressure load on the push-button switch in releasing reaches the point F in FIG. 1, that is, at the point when the metal dome restores from the depressed form, the push button vibrates as indicated by the solid line in FIG. 4. Thereby, it was found out that the human, in using the push-button switch, receives 1 cycle of the vibration stimulus for about 8 ms (a frequency of approximately 125 Hz).

Accordingly, when the touch face in the form of a plate such as the touch sensor is pressed down, by stimulating the pressure sense letting the operator voluntarily press down the touch face without vibrating the touch face in response to the pressure load between the points A and B illustrated in FIG. 1 and, in such a state, by stimulating the tactile sense by, for example, vibrating the touch face for 1 cycle at the frequency of 170 Hz at the point B, or by stimulating the tactile sense by providing the operator with, for example, a vibration waveform actually measured from the push-button switch, the click sensation similar to that obtained when operating the push-button switch that brought the result of measurement in FIG. 4 may be obtained.

According to the input apparatus previously suggested by the applicant based on the above method, when the touch face is pressed down, the pressure sense is stimulated until the pressure load satisfies a predetermined standard for receiving an input and, when the predetermined standard is satisfied, the tactile sense is stimulated by vibration of the touch face by a vibration unit with a predetermined drive signal, that is, with particular frequency, cycle as a drive time (wavelength), waveform and vibration amplitude. Thereby, the realistic click sensation similar to that obtained when pressing down the push-button switch may be provided to the operator.

Embodiments of the present invention based on the method set forth above will be described below with reference to the accompanying drawings.

The tactile sensation providing apparatus according to the present invention detects the pressure load separately from the operation of the touch sensor to receive an input and vibrates the touch sensor such that the realistic click sensation similar to that obtained when pressing the push-button switch is provided to the operator of the touch sensor. That is, when the touch sensor is operated, the pressure load is detected separately from the operation of the touch sensor to receive an input in response to the operation and, when the pressure load on the touch face of the touch sensor satisfies a standard load for providing the tactile sensation, the touch face is vibrated such that the realistic click sensation is provided to the operator without inflicting a feeling of strangeness.

(First Embodiment)

Figure 5:
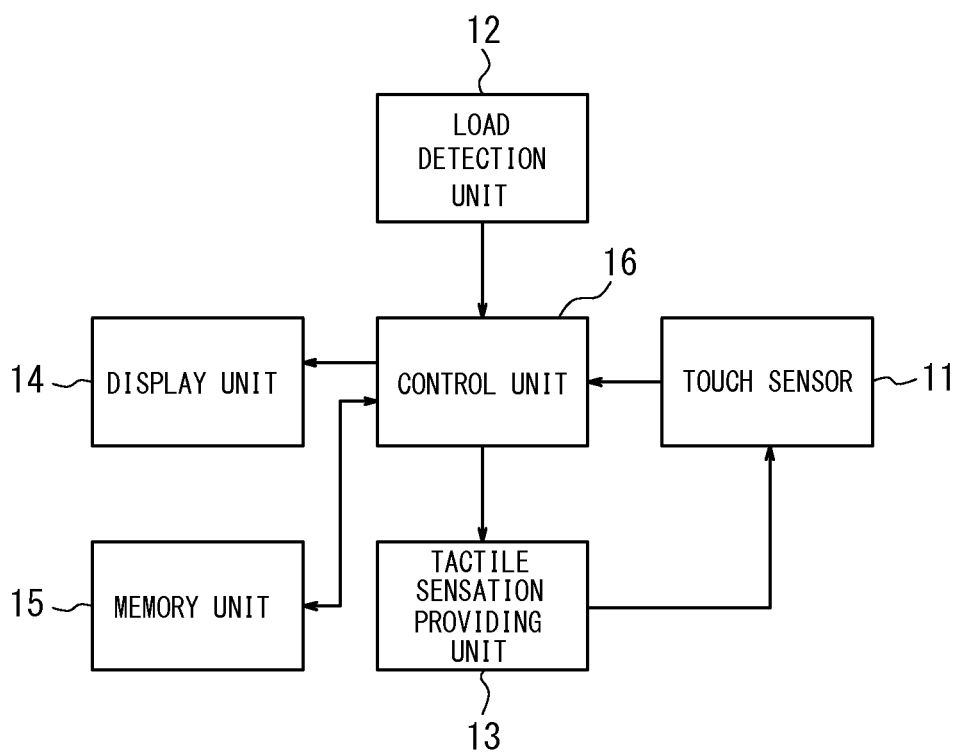
FIG. 5 is a block diagram illustrating a schematic configuration of a tactile sensation providing apparatus according to a first embodiment of the present invention.

FIG. 5 is a block diagram illustrating a schematic configuration of a tactile sensation providing apparatus according to a first embodiment of the present invention. This tactile sensation providing apparatus has a touch sensor 11, a load detection unit 12, a tactile sensation providing unit 13, a display unit 14, a memory unit 15, and a control unit 16 to control overall operations. The touch sensor 11 receives an input to the display unit 14 by a finger and the like and may be of a known type such as, for example, a resistive film type, a capacitive type, an optical type and the like. The load detection unit 12 detects the pressure load applied to the touch face of the touch sensor 11 and may be configured by using an element such as, for example, a strain gauge sensor, a piezoelectric element or the like, which linearly reacts to the load. The tactile sensation providing unit 13 vibrates the touch sensor 11 and may be configured by using, for example, a piezoelectric vibrator. The display unit 14 displays an input object of an input button or the like such as the push-button switch (push-type button switch) and may be configured by using, for example, a liquid crystal display panel, an organic EL display panel or the like. A memory unit 15 stores (memorizes) drive signal information for the tactile sensation providing unit 13. The memory unit 15 may be configured by using a built-in memory of the control unit 16. The memory unit 15 also stores drive signal information for providing a click sensation (button depression sensation) at a time. The memory unit 15 may also store other drive signal information for providing a tactile sensation in addition to the drive signal information for providing the click sensation (button depression sensation) at a time.

FIG. 6 illustrates an exemplary implementation structure of the tactile sensation providing apparatus illustrated in FIG. 5; FIG. 6(a) is a cross-sectional view of a main section, and FIG. 6(b) is a plane view of the main section. The display unit 14 is contained and held in a housing 21. The touch sensor 11 is disposed on the display unit 14 via insulators 22 made of elastic members. In the tactile sensation providing apparatus according to the present embodiment, the display unit 14 and the touch sensor 11 are rectangular in shape in a planar view and the touch sensor 11 is disposed on the display unit 14 via the insulators 22 arranged at four corners outside a display area A of the display unit 14 indicated by a chain double-dashed line in FIG. 6(b).

The housing 21 is provided with an upper cover 23 covering a surface area of the touch sensor 11 outside the display area of the display unit 14. An insulator 24 made of elastic member is arranged between the upper cover 23 and the touch sensor 11.

The touch sensor 11 illustrated in FIG. 6 may have, for example, a surface member having a touch face 11a and constituted by a transparent film or a glass, and a rear face member constituted by the glass or acryl. The touch sensor 11 may be designed such that, when the touch face 11a is pressed down, the pushed position or an entire structure is bent (strained) slightly in accordance with a pressing force.

A strain gauge sensor 31 to detect the load (a pressuring force) applied on the touch sensor 11 is provided, adhered or the like, on a surface of the touch sensor 11 at a position close to each side covered by the upper cover 23. Also, the piezoelectric element 32 to vibrate the touch sensor 11 is provided, adhered or the like, on the rear face of the touch sensor 11 close to each of two opposed sides. That is, the tactile sensation providing apparatus illustrated in FIG. 6 has the load detection unit 12 in FIG. 5 configured by using four strain gauge sensors 31 and the vibration unit 13 configured by using two piezoelectric transducers 32. The tactile sensation providing unit 13 vibrates the touch sensor 11 to vibrate the touch face 11a. It is to be noted that the housing 21, the upper cover 23 and the insulator 24 illustrated in FIG. 6(a) are omitted in FIG. 6(b).

Figure 7:
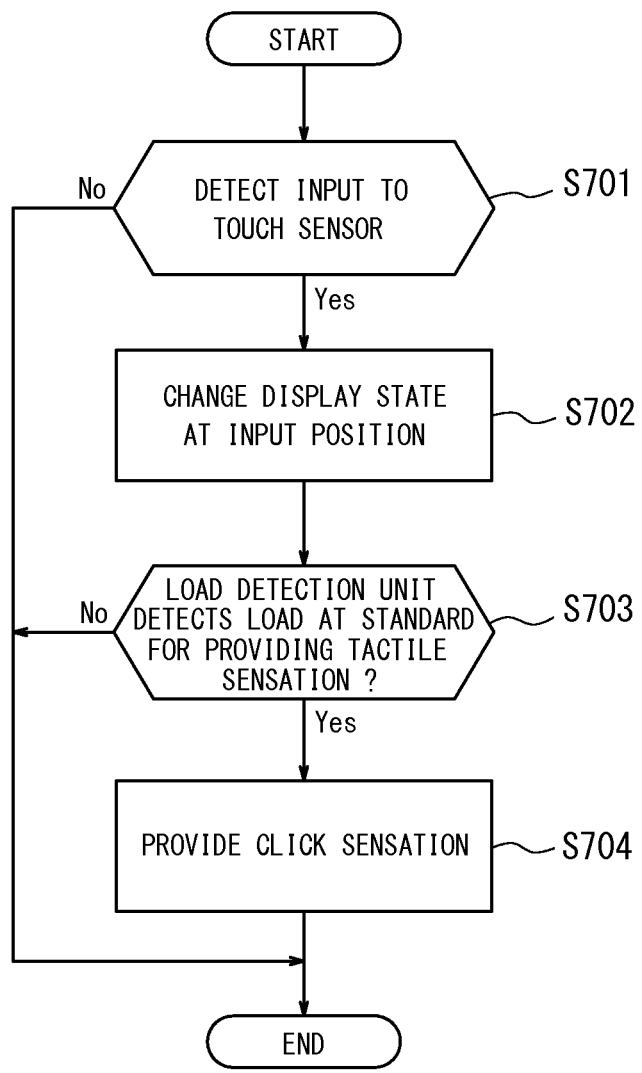
FIG. 7 is a flowchart of an operation of the tactile sensation providing apparatus illustrated in FIG. 5.

FIG. 7 is a flowchart of an operation of the tactile sensation providing apparatus according to the present embodiment. The control unit 16 monitors an input to the touch sensor 11 and a load detected by the load detection unit 12. The control unit 16 then detects whether the input to the touch sensor 11 by a pressing object (pressing means) such as a finger, a stylus pen and the like is an input to the input object displayed on the display unit 14 (step S701). As a result, when the control unit 16 detects that it is the input to the input object, the control unit 16 changes a display state of a part (input part) in the display unit 14 contacted by the pressing object (pressing means), by changing color or the like (step S702).

The control unit 16 also detects whether the pressure load detected by the load detection unit 12 increases with the pressure on the touch sensor 11 and satisfies the standard load for providing the tactile sensation (step S703). As a result, when the control unit 16 detects that the pressure load satisfies the standard load, the control unit 16 retrieves predetermined drive signal information (drive signal information for providing the click sensation (button depression sensation) at a time) from the memory unit 15. Then, the control unit 16 drives the tactile sensation providing unit 13 one time by using a drive signal based on the retrieved drive signal information (step S704). Thereby, the touch sensor 11 is vibrated in a predetermined vibration pattern so as to provide the click sensation (button depression sensation) one time. According to the present invention, one provision of the tactile sensation (one drive) may provide the button depression sensation. The load detection unit 12 detects the load from, for example, an average output value of the four strain gauge sensors 31. Also, the tactile sensation providing unit 13 drives, for example, two piezoelectric vibrators 32 in phase.

Here, the standard load for providing the tactile sensation to be detected at step S703 is, for example, the load at the point B illustrated in FIG. 1. Accordingly, the standard load may be appropriately set in accordance with the load characteristic of an intended push-button switch in pressing. For example, the standard load may be set equal to a load at which the touch sensor 11 responds (setting a timing to provide the tactile sensation to be the same as a timing of response by the touch sensor 11) or set higher than the load at which the touch sensor 11 responds (setting the timing to provide the tactile sensation later than the timing of response by the touch sensor 11). Especially when being applied to a mobile terminal, the standard load may be set by a user as desired at a value equal to or higher than the load at which the touch sensor 11 responds (setting the timing to provide the tactile sensation later than the timing of the response by the touch sensor 11) such that elder user may set it heavier (slower) and a user who often writes messages may set it lighter (quicker). Accordingly, the click sensation is provided to the operator through the pressing object (pressing means) pressing the touch face 11a of the touch sensor 11, and thereby the operator recognizes that an input operation is completed.

The drive signal information of the drive signal for driving the tactile sensation providing unit 13 at step S704 is appropriately set according to the click sensation to be provided and preliminarily stored in the memory unit 15. The drive signal information includes information about, for example, a frequency, a cycle (wavelength), a waveform and amplitude for stimulating the tactile sense. For example, in order to provide the click sensation represented by the metal dome switch employed by the mobile terminal, the stored drive signal information includes a value of a sine wave with a frequency of 170 Hz for 1 cycle and amplitude to vibrate the touch face 11a by 15 μm under a predetermined standard load. When the standard load described above is applied, the control unit 16 retrieves the predetermined drive signal information from the memory unit 15 and drives the tactile sensation providing unit 13 one time with the drive signal based on the retrieved drive signal information. Thereby, the realistic click sensation may be provided one time to the operator.

The tactile sensation providing apparatus according to the present embodiment, as described above, stimulates the tactile sense until the load applied on the touch sensor 11 detected by the load detection unit 12 satisfies the standard load for providing the tactile sensation. Then, when the load satisfies the standard load, the predetermined drive signal information is retrieved from the memory unit 15 and the tactile sensation providing unit 13 is driven such that the touch face 11a is vibrated in the predetermined vibration pattern and the tactile sense is stimulated. Thereby, the click sensation is provided to the operator such that the operator recognizes that the input operation is completed. Accordingly, even when the button switch such as the push-button switch (push-type button switch) is graphically depicted on the touch sensor, since the operator may perform the input operation feeling the realistic click sensation similar to that obtained when operating the push-button switch, the operator may not have the feeling of strangeness. Moreover, since the operator may perform the input operation in conjunction with perception to "have tapped" the touch sensor 11, erroneous input caused by mere tapping may be prevented.

Also, when the standard load for providing the tactile sensation is set higher than the load at which the touch sensor 11 responds (setting the timing to provide the tactile sensation later than the timing of response by the touch sensor 11), an input position may be determined based on a touch operation to the touch face 11a and the display state of the input object at a corresponding portion of the display unit 14 may be changed. Then, when the pressure load on the touch face 11a detected by the load detection unit 12 satisfies the standard load for providing the tactile sensation, the tactile sensation providing unit 13 is driven such that the click sensation is provided and, by confirming the input position, a predetermined operation may be performed. In this case, the operator may confirm that the input object is selected, by seeing a change of the display state of the input object displayed on the display unit 14. Moreover, with the click sensation provided to the operator upon pressing the touch face 11a, the operator may recognize that selection of the input object is determined. Thereby, erroneous input by a so-called wandering finger may be prevented.

(Second Embodiment)

Figure 8:
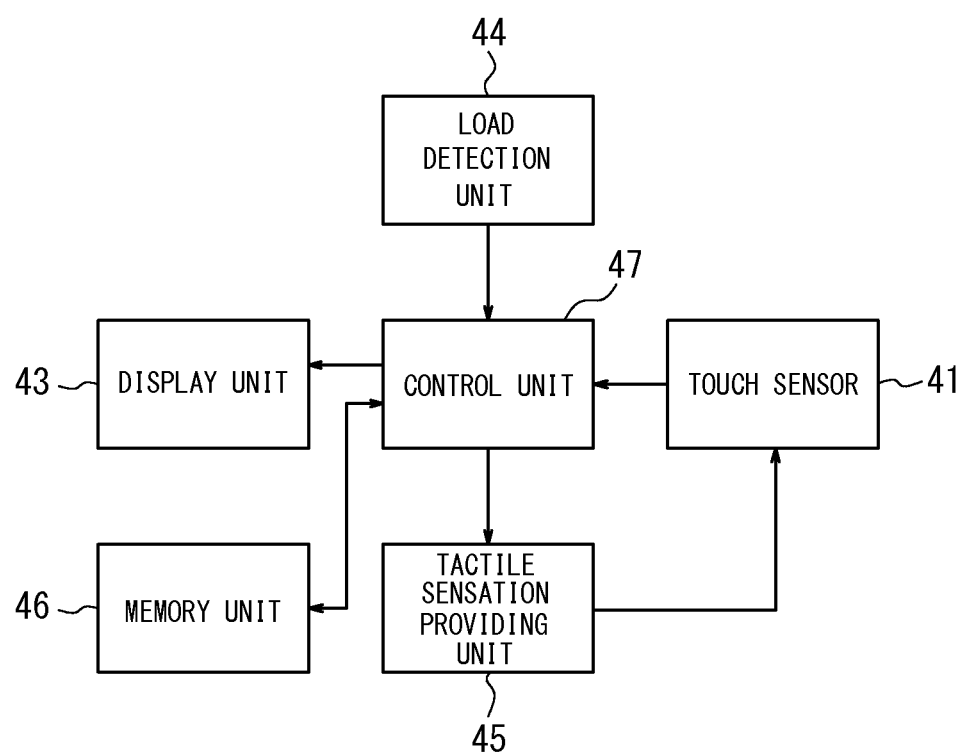
FIG. 8 is a block diagram illustrating a schematic configuration of a tactile sensation providing apparatus according to a second embodiment of the present invention.
Figure 9:
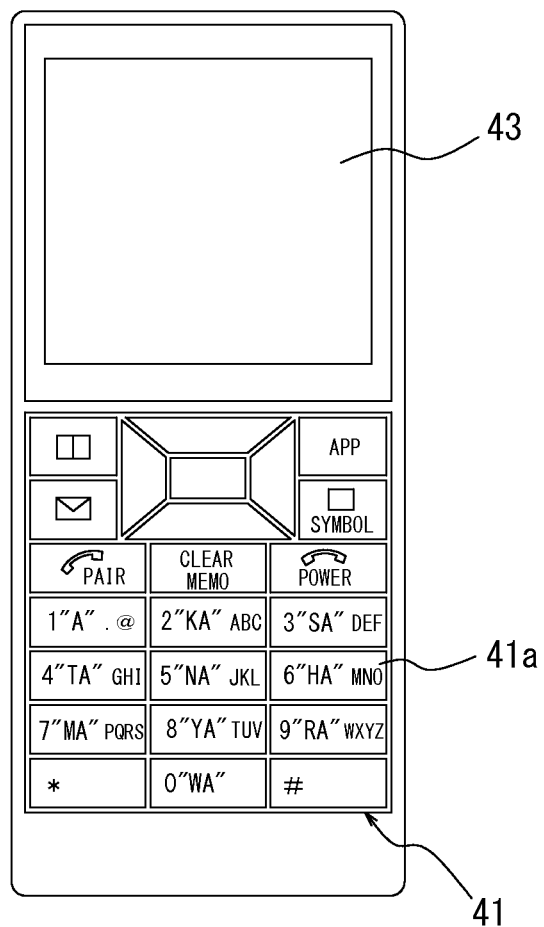
FIG. 9 is an elevation view of the tactile sensation providing apparatus illustrated in FIG. 8.

FIG. 8 and FIG. 9 illustrate a tactile sensation providing apparatus according to a second embodiment of the present invention; FIG. 8 is a block diagram illustrating a schematic constitution, and FIG. 9 is an elevation view. This tactile sensation providing apparatus is mounted on, for example, the mobile terminal and, as illustrated in FIG. 8, includes a touch sensor 41 configured to receive an input, a display unit 43 configured to display information based on a position of the input received by the touch sensor 41, a load detection unit 44 configured to detect the pressure load on the touch sensor 41, a tactile sensation providing unit 45 configured to vibrate the touch sensor 41, a memory unit 46 configured to store (memorize) the drive signal information for the tactile sensation providing unit 45, and a control unit 47 configured to control overall operations.

On the touch sensor 41, as illustrated in FIG. 9, a plurality of input objects 41a such as a numeric keypad are already provided, printed, adhered or the like. Accordingly, in the tactile sensation providing apparatus of the present embodiment, each of the input objects 41a constitutes the touch face. In order to prevent an erroneous input to press a plurality of adjacent input objects 41a, an effective pressing area for receiving an input is set to be smaller than a formation area of the input object 41a. In FIG. 8, the load detection unit 44 and the tactile sensation providing unit 45 have the strain gauge sensors and the piezoelectric vibrators, respectively, in the same manner as those of the tactile sensation providing apparatus illustrated in FIG. 6.

The control unit 47 monitors an input to the touch sensor 41 and a load detected by the load detection unit 44. Then, when the pressure load detected by the load detection unit 44 increases with the pressure on the touch sensor 41 and satisfies the standard load for providing the tactile sensation, the control unit 47 retrieves the predetermined drive signal information from the memory unit 46. The control unit 47 drives the tactile sensation providing unit 45 one time with the drive signal based on the retrieved drive signal information such that the touch face 41a of the touch sensor 41 is vibrated in the predetermined vibration pattern.

That is, the control unit 47 detects the pressure load separately from detection of an input to the effective pressing area of the input object by the touch sensor 41. Then, in the same manner as that of the tactile sensation providing apparatus according to the first embodiment, the control unit 47, at a point when the load on the touch sensor 41 increases and satisfies the standard load for providing the tactile sensation, retrieves the drive signal information similar to that of the first embodiment from the memory unit 46 and drives the tactile sensation providing unit 45 one time with the drive signal based on the drive signal information. Thereby, the click sensation is provided one time to the operator. Also, upon receiving the input detected by the touch sensor 41, the control unit 47 controls the display unit 43 to display according to the input.

As described above, when the standard load for providing the tactile sensation is set to be equal to or higher than the load at which the touch sensor 41 responds, since the operator, in the same manner as the first embodiment, may perform the input operation to the touch sensor 41 obtaining the realistic click sensation similar to that obtained when operating the push-button switch, the operator does not have the feeling of strangeness. Moreover, since the operator may perform the input operation in conjunction with the perception to "have tapped" the touch sensor 41, the erroneous input caused by mere tapping may be prevented.

Here, together with the research on the method for providing the click sensation described above, results of sensory evaluations on the click sensation conducted by the above researchers will be described. The results of the sensory evaluations described below were conducted by using the input apparatus previously suggested by the applicant described above.

Although there are deviations to some degrees according to models of terminals, the metal dome switches widely used for commercially available mobile terminals have the load characteristics that the load rapidly decreases when a predetermined load, roughly equal to or less than 6 N, or generally equal to or less than 3 N, is applied thereon. As such, the above researchers conducted sensory evaluations by setting a load (a load at a point B in FIG. 1) on the touch sensor for starting drive of the vibration unit (corresponding to the tactile sensation providing unit of the present invention) at 1.5 N and having the frequency, the cycle (wavelength) and the waveform of the drive signal as parameters.

Examples of results of the evaluations are illustrated in FIG. 10 to FIG. 13. In FIG. 10 to FIG. 13, the subjects are the five people involved in the sensory evaluations illustrated in FIG. 2 and FIG. 3. The evaluation was conducted for three items "feel click sensation", "good feeling" and "similar to mobile terminal" Note that an item "click sensation" of the item "feel click sensation" in FIG. 10 to FIG. 13 indicates a tactile sensation provided in a series of operations including pressing and releasing of the touch sensor. For the item "feel click sensation", "No" scores 1 and "Strongly feel" scores 7. For the item "good feeling", "Bad" scores 1 and "Good" scores 7. For the item "similar to mobile terminal", "not similar" scores 1 and "very similar" scores 7. The score of each item represents an average score of the five people.

Figure 10:
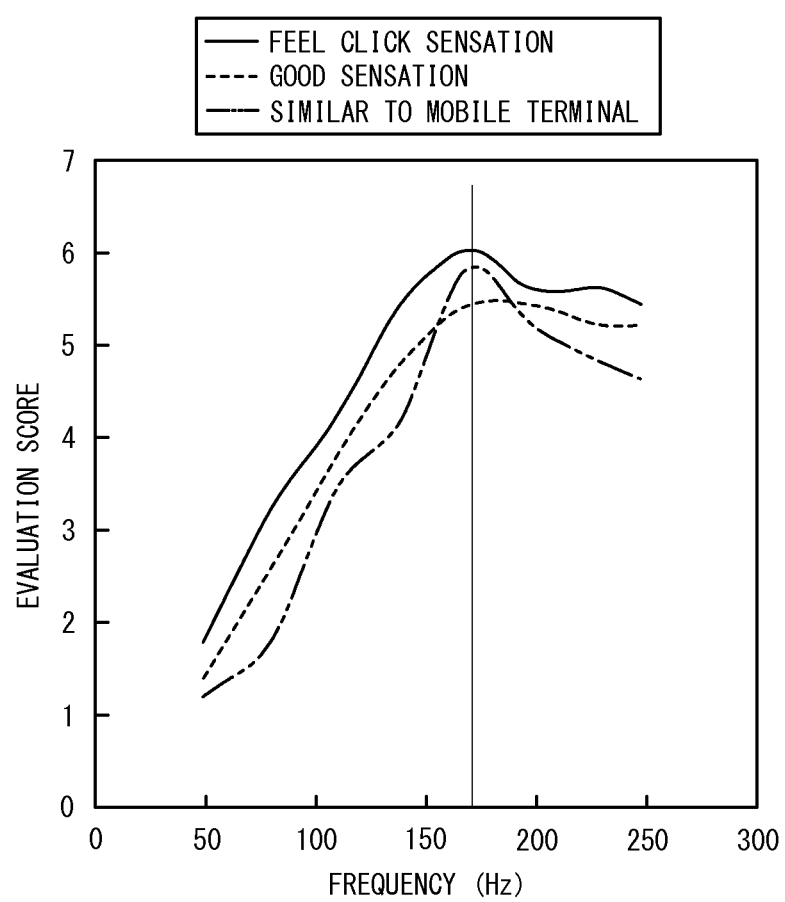
FIG. 10 is a diagram illustrating a result of a sensory evaluation on a click sensation with different frequencies for vibrating a touch sensor.

FIG. 10 illustrates a result of an evaluation with a variety of frequencies. For this sensory evaluation, the cycle (wavelength) of the drive signal for driving the vibration unit, that is, the drive time was set to be 1 cycle, the sine wave was used as the waveform, and the frequency was varied in a range of 50-250 Hz. The amplitude of the drive signal was signal amplitude to obtain the vibration amplitude of 15 µm under the predetermined standard load. As can be seen in FIG. 10, it was observed that, although the highest evaluation was obtained at the frequency of 170 Hz, the human may obtain the click sensation similar to that of the mobile terminals at a frequency of 140 Hz or higher.

Figure 11:
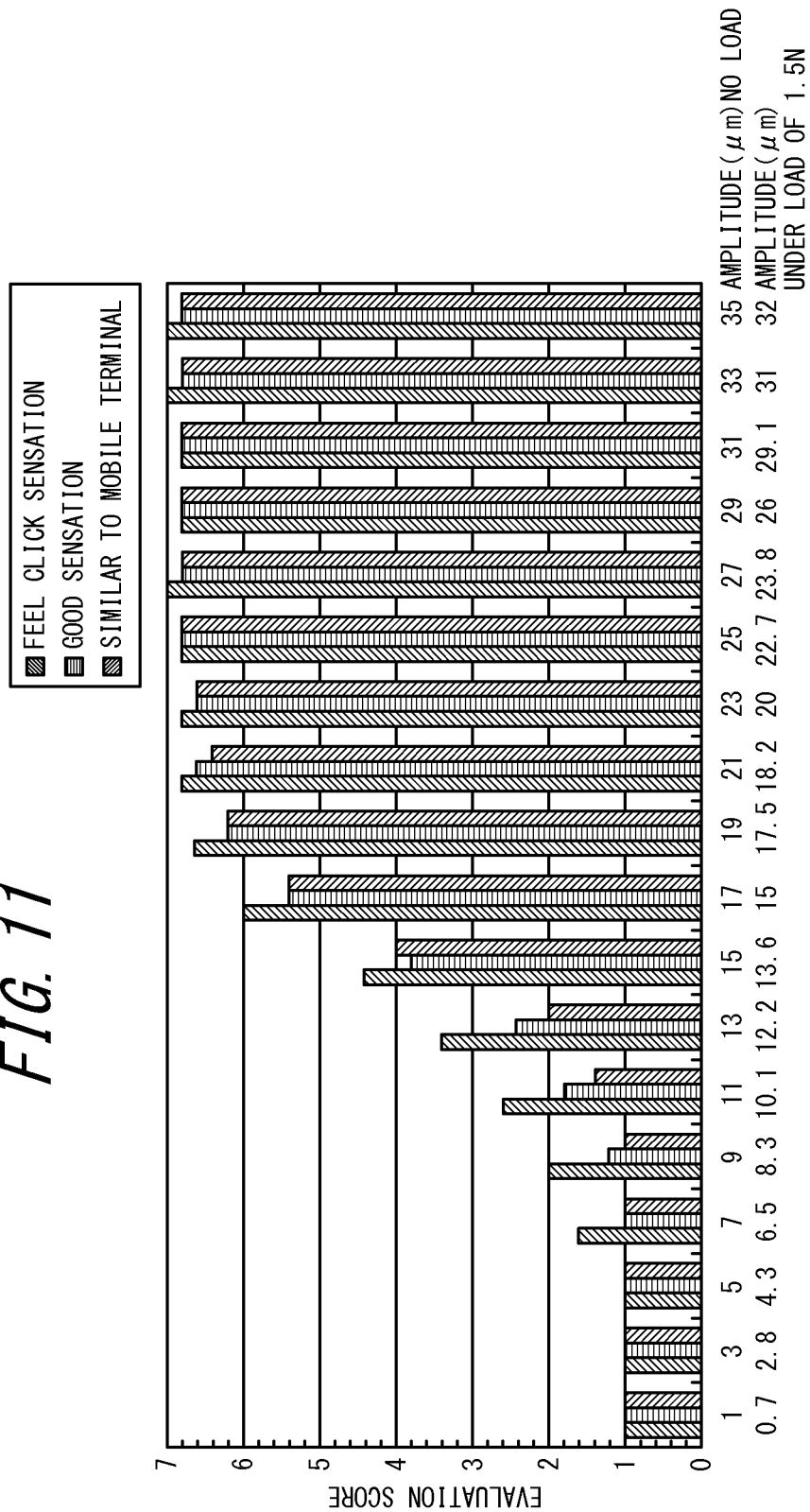
FIG. 11 is a diagram illustrating a result of the sensory evaluation on the click sensation with different vibration amplitude of the touch sensor.

FIG. 11 illustrates a result of an evaluation with a variety of amplitude of the drive signal. For this sensory evaluation, the frequency of the drive signal for driving the vibration unit was set at 170 Hz, the cycle was set to be 1 cycle, and the sine wave was used as the waveform. The signal amplitude was varied such that, with no load on the touch sensor, the touch sensor is vibrated in predetermined amplitude in a range of 1-35 µm. Under a condition of the vibration amplitude with no load, the vibration unit was driven when a load of 1.5 N was applied to the touch sensor, in order to evaluate each item. A horizontal axis in FIG. 11 represents the vibration amplitude under the load of 1.5 N and the vibration amplitude with no load on the touch sensor. As a result, as can be seen in FIG. 11, it was observed that, in a state that the load of 1.5 N is applied, the human may substantially obtain the click sensation when the vibration amplitude is 15 µm or more. That is, in a state that the load of 1.5 N is applied on the touch sensor, when the touch sensor is vibrated with the vibration amplitude of 15 µm or more for 1 cycle at a constant frequency of 170 Hz, the human may feel the click sensation.

Figure 12:
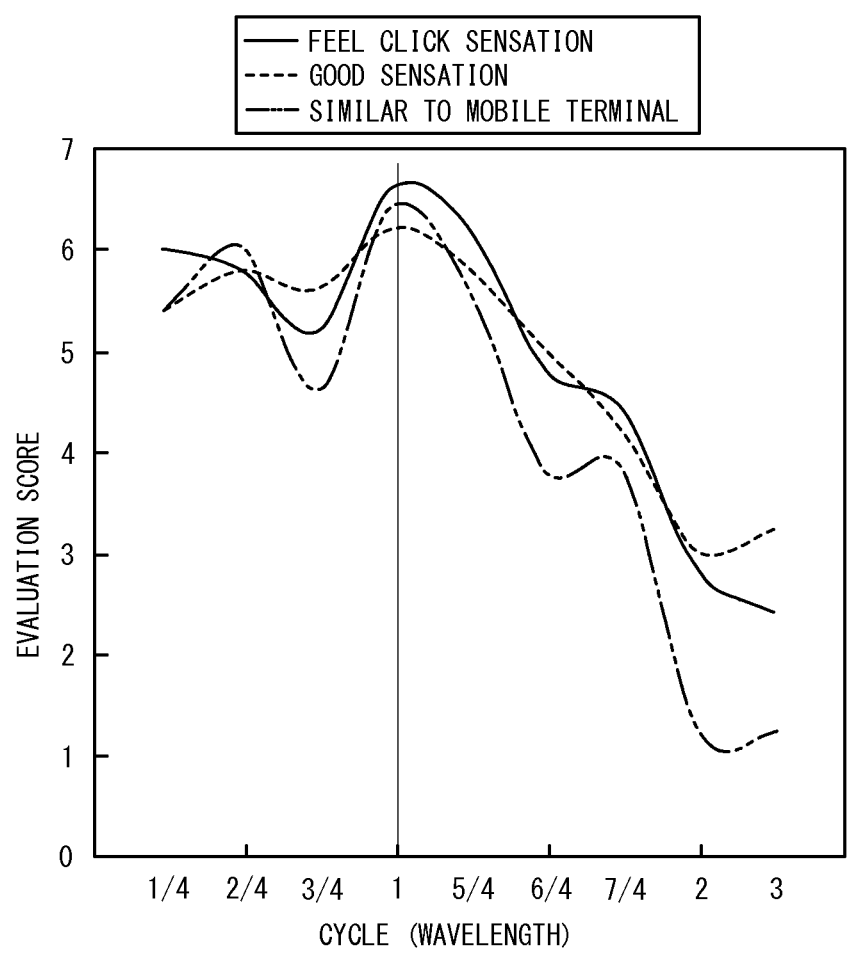
FIG. 12 is a diagram illustrating a result of the sensory evaluation on the click sensation with different cycles of a drive signal for vibrating the touch sensor.

FIG. 12 illustrates a result of an evaluation with a variety of cycles (wavelengths) as the drive times. For this sensory evaluation, the sine wave was used as the waveform of the drive signal for driving the vibration unit; the signal amplitude was set to obtain the vibration amplitude of 15 µm under the predetermined standard load applied on the touch sensor; the frequency was 170 Hz; and the cycle was varied in a range of ¼ to 3 cycles. For ¼cycle and ½cycle, the signal amplitude was set such that a vibration displacement on the touch sensor was approximately the same as those with other cycles, that is, such that the vibration amplitude of approximately 15 µm may be obtained. As a result, as can be seen in FIG. 12, the highest evaluation was obtained when the cycle (wavelength) was 1 cycle. It was also observed that, although basically good results were obtained with 5/4 cycles and shorter than 1 cycle, sensations different from the click sensation of the mobile terminal was obtained with 3/2 or longer cycles.

Figure 13:
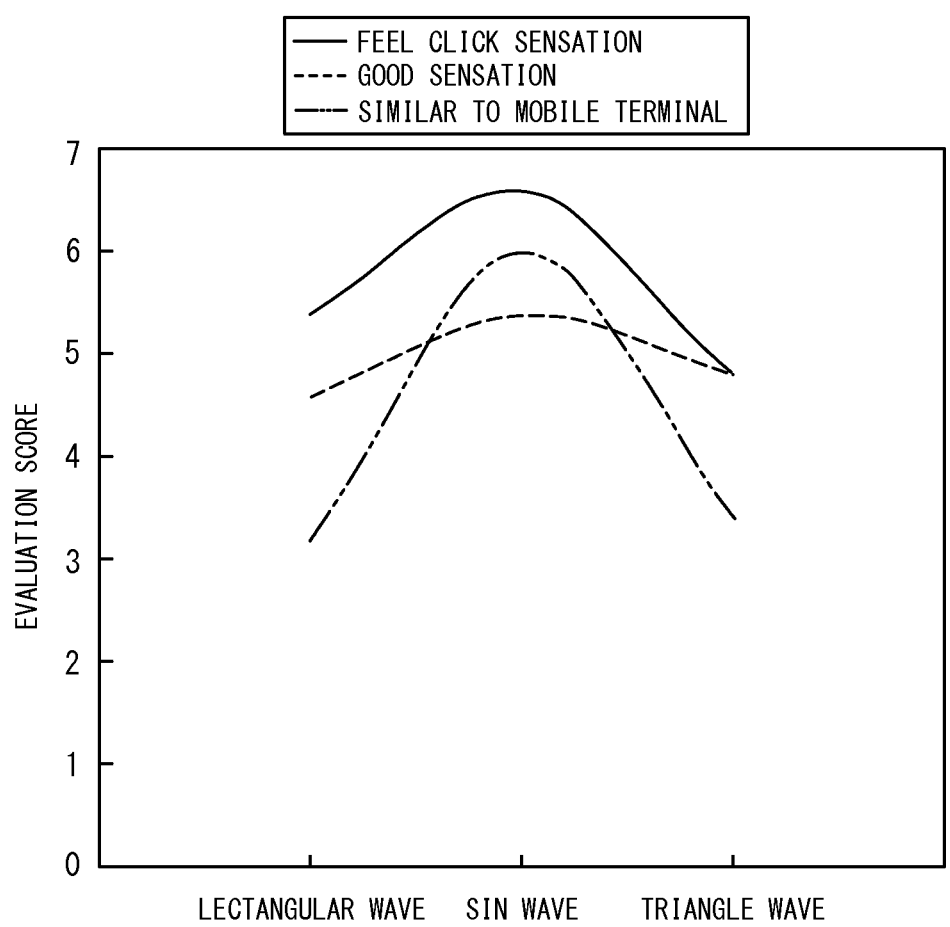
FIG. 13 is a diagram illustrating a result of the sensory evaluation on the click sensation with different waveforms of the drive signal for vibrating the touch sensor.

FIG. 13 illustrates a result of an evaluation with a variety of waveforms of the drive signal. For this sensory evaluation, the sine wave, a square wave and a triangle wave were used as the waveform of the drive signal for driving the vibration unit. Also, each signal had a frequency of 170 Hz, the signal amplitude was set such that the vibration amplitude becomes 15 µm under the predetermined standard load applied to the touch sensor, and the cycle was set to be 1 cycle. As a result, as can be seen in FIG. 13, the highest evaluation was obtained with the sine wave.

Figure 14:
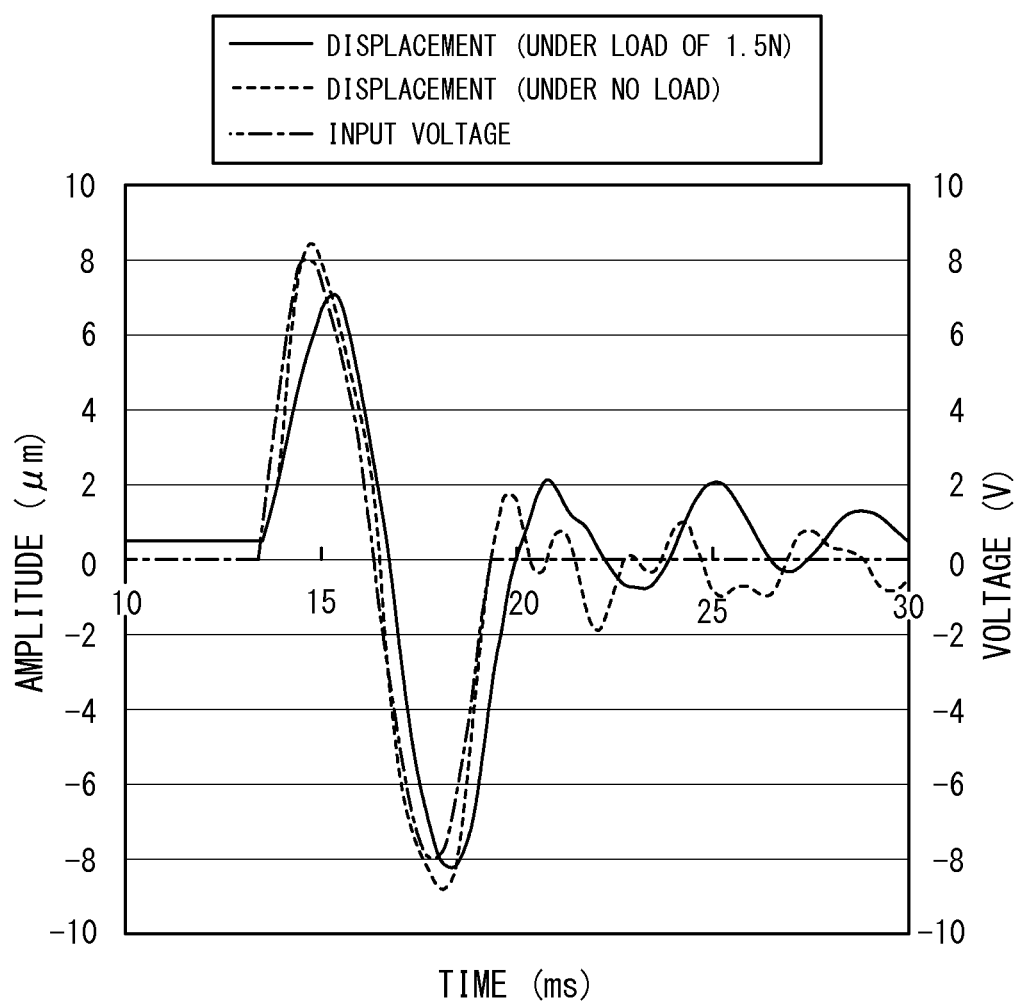
FIG. 14 is a diagram illustrating the waveform of the drive signal for vibrating the touch sensor and an actual waveform of the vibration amplitude of the touch sensor.

Here, the drive signal of the sine wave (input voltage of the vibration unit), as indicated by a dashed line in FIG. 14, is not limited to one cycle in which the voltage increases from 0 degree phase and then decreases but may be 1 cycle from any phase such as 1 cycle in which the voltage decreases from 180 degree phase and then increases. FIG. 14 illustrates a waveform (broken line) of the vibration amplitude of the touch sensor under no load and a waveform (solid line) of the vibration amplitude of the touch sensor under the load of 1.5 N when the vibration unit is driven by the input voltage indicated by the dashed line.

From the example of the results of the evaluation described above, it was observed that, when a load satisfying the predetermined standard load is applied on the touch sensor, by driving the vibration unit is driven by the drive signal having, for example, 5/4 cycle or less, preferably 1 cycle, of the sine wave with a frequency of 140 Hz or more, preferably 170 Hz, and the amplitude to vibrate the touch sensor by approximately 15 μm or more, the realistic click sensation of the button depression may be provided to the operator.

The tactile sensation providing apparatus according to each of the above embodiments, the tactile sensation providing unit 13 (45) is driven based on the results of the sensory evaluations described above. That is, when the load detection unit 12 (44) detects the pressure load at 1.5 N as the standard load for providing the tactile sensation, the tactile sensation providing unit 13 (45) is driven one time by the drive signal of, for example, the sine wave with a frequency of 140 Hz or more, preferably 170 Hz, for 5/4 cycle or less, preferably 1 cycle and the amplitude to vibrate the touch sensor 11 (41) by approximately 15 μm or more. Thereby, the realistic click sensation may be provided one time to the operator.

Third Embodiment

When the human operates the push-button switch, the human is given a tactile stimulus at a finger from the push-button switch both in pressing and in releasing, as illustrated in FIG. 4. As such, a tactile sensation providing apparatus according to a third embodiment of the present invention, using the tactile sensation providing apparatus according to the first and the second embodiments, provides the operator with a tactile sensation in releasing as well (hereinafter, the tactile sensation in releasing is appropriately referred to as a release sensation). Thereby, a realistic tactile sensation more similar to that of the push button switch is provided to the operator. The following is a description of an operation of the tactile sensation providing apparatus according to the present embodiment with reference to the configuration illustrated in FIG. 5 and FIG. 6, by way of example. Information of the drive signal (drive signal information) for driving the tactile sensation providing unit in releasing is preliminarily stored in the memory unit 15 in the same manner as the drive signal information for driving the tactile sensation providing unit in pressing.

Figure 15:
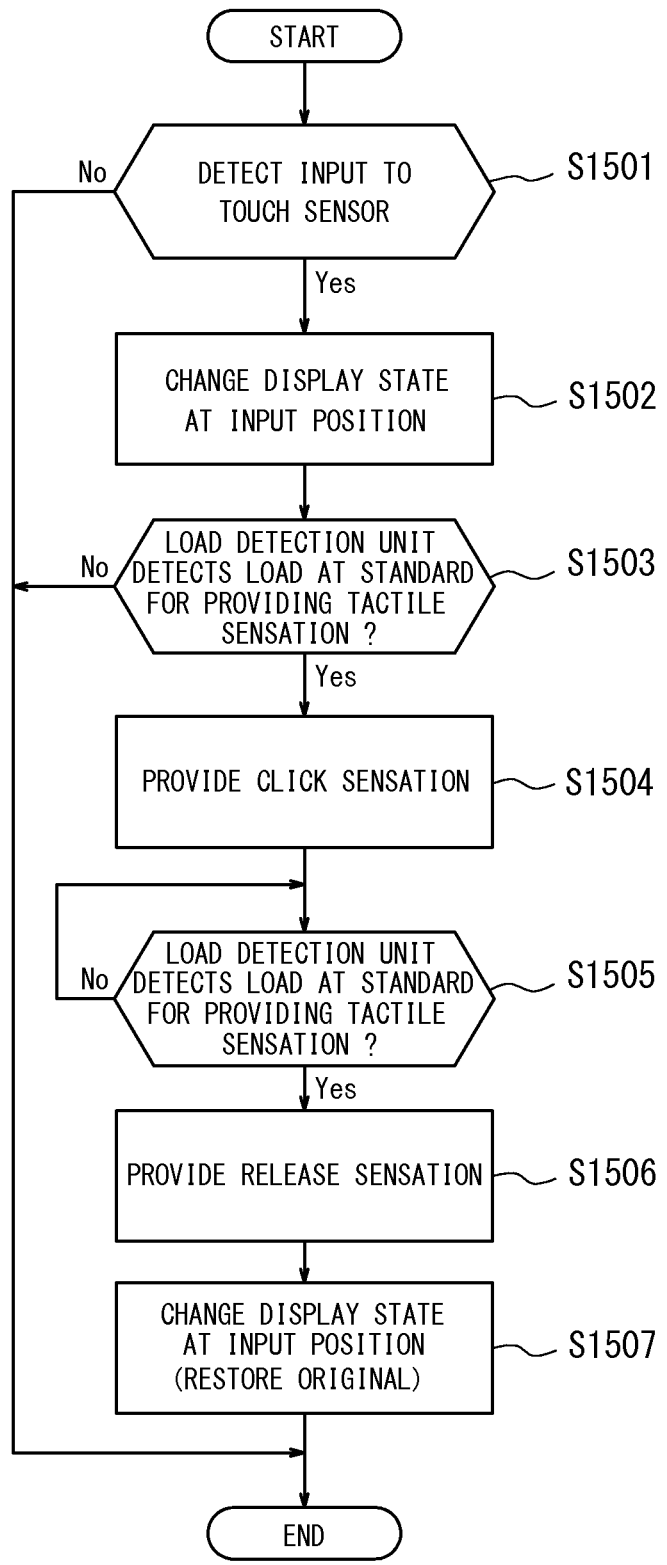
FIG. 15 is a flowchart illustrating an operation of the tactile sensation providing apparatus according to a third embodiment of the present invention.

FIG. 15 is a flowchart of the operation of the tactile sensation providing apparatus according to the present embodiment. In FIG. 15, processes at steps S1501-S1504 are similar to those at steps S701-S704 illustrated in FIG. 7. That is, as described with reference to FIG. 7, when the control unit 16 detects an input to the input object displayed on the display unit 14 (step S1501), the control unit 16 changes the display state, such as color or the like, of a position (input position) on the display unit 14 where the pressing object (pressing means) has contacted (step S1502).

Further, when the control unit 16 detects that the pressure load detected by the load detection unit 12 increases with the pressure on the touch sensor 11 and satisfies the standard load for providing the tactile sensation (step S1503), the control unit 16 retrieves the predetermined drive signal information from the memory unit 15 and drives the tactile sensation providing unit 13 one time with the drive signal based on the retrieved drive signal information. Thereby, the touch sensor 11 is vibrated in the predetermined vibration pattern (step S1504) such that, through the pressing object (pressing means) pressing the touch sensor 11, the click sensation is provided one time to the operator. Here, the standard load for providing the click sensation, in the same manner as the above embodiments, is set to be equal to or higher than the pressure load at which the touch sensor 11 responds, that is, detects the input.

Then, in releasing, when the control unit 16 detects that the load detected by the load detection unit 12 satisfies the standard load for providing the tactile sensation (step S1505), the control unit 16, in the same manner as that in pressing, retrieves the predetermined drive signal information from the memory unit 15 and drives the tactile sensation providing unit 13 one time with the drive signal based on the retrieved drive signal information. Thereby, the touch sensor 11 is vibrated in the predetermined vibration pattern (step S1506) such that the release sensation is provided to the operator one time through the pressing object (pressing means) pressing the touch sensor 11. In addition, the control unit 16, substantially simultaneously with driving of the tactile sensation providing unit 13, changes the display state of the position (input position) on the display unit 14 contacted by the pressing object (pressing means) by restoring an original state or the like (step S1507). Thereby, the operator recognizes that the input operation is completed.

Here, a standard load (a second standard) for providing the tactile sensation in releasing at step S1505, that is, after the click sensation is provided in pressing, may be set at any value lower than the standard load (a first standard) for providing the click sensation in pressing detected at step S1503. Also, the drive signal for driving the tactile sensation providing unit 13 in releasing at step S1506 may be either equal to or different from the drive signal used in pressing at step S1504. For example, the frequency of the drive signal in pressing when the touch sensor 11 detects the input may be 170 Hz, and that in releasing may be 125 Hz as illustrated in FIG. 4, for example.

As described above, in releasing after the click sensation is provided in pressing, when the load detected by the load detection unit 12 satisfies the standard load for providing the tactile sensation, the tactile sensation providing unit 13 is driven in the same manner as that in pressing by the predetermined drive signal such that the touch sensor 11 is vibrated in the predetermined vibration pattern. Thereby, the release sensation corresponding to the click sensation may be provided. Accordingly, in combination with the click sensation in pressing, the realistic tactile sensation more similar to that of the push-button switch may be provided to the operator.

Figure 16:
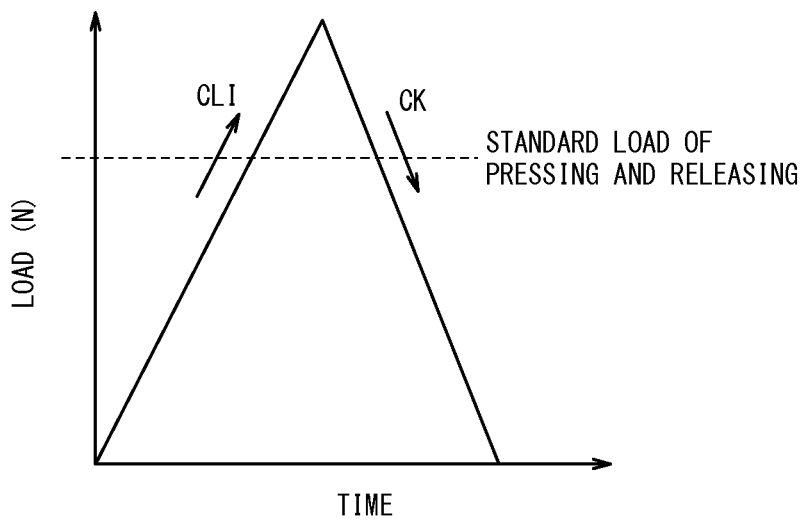
FIG. 16 is a diagram illustrating an example of the click sensation provided by the tactile sensation providing apparatus according to the third embodiment when a standard load of pressing for providing a tactile sensation in pressing and a standard load of releasing for providing a tactile sensation in releasing are set to be equal to each other.

For example, when a standard load of pressing for driving the tactile sensation providing unit 13 in pressing and a standard load of releasing for driving the tactile sensation providing unit 13 in releasing are set to be equal to each other, if a maximum load in pressing exceeds the standard load, the click sensation and the release sensation may be provided in pressing and in releasing, respectively, as illustrated in FIG. 16. Accordingly, a tactile sensation more similar to that of the push-button switch may be provided to the operator. Note that, in FIG. 16 and other figures, "Cli" and "Ck" represent the tactile sensation the human feels.

Figure 17:
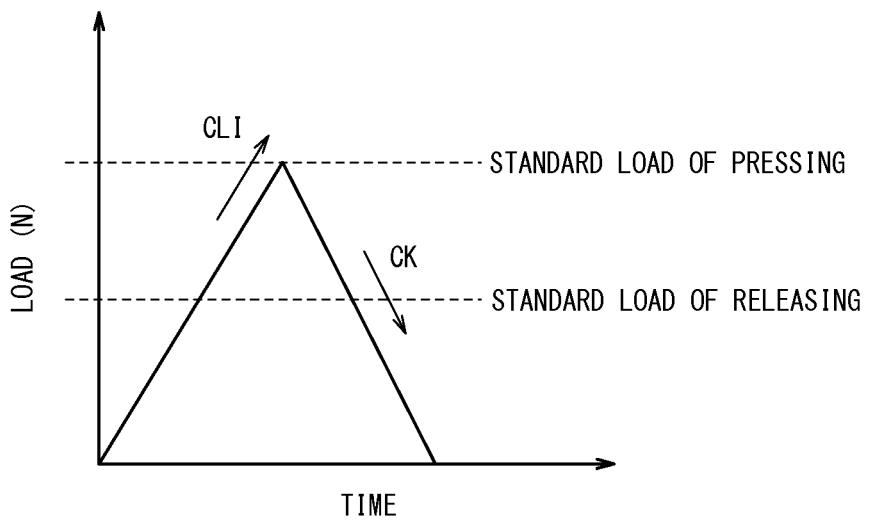
FIG. 17 is a diagram illustrating an example of the click sensation provided by the tactile sensation providing apparatus according to the third embodiment when the standard load of releasing for providing the tactile sensation is set to be smaller than the standard load of pressing for providing the tactile sensation.

When the standard load of releasing for driving the tactile sensation providing unit 13 is set at any value lower than that of pressing, even if the maximum load in pressing is equal to the standard load of pressing, that is, even if the pressing object (pressing means) is pulled back at a point when the pressure load is at the standard load of pressing, the click sensation and the release sensation may be provided in pressing and in releasing, respectively, as illustrated in FIG. 17. As illustrated in FIG. 16, when the standard load of pressing for driving the tactile sensation providing unit 13 and the standard load of releasing for driving the tactile sensation providing unit 13 are set to be equal to each other, if the maximum pressing load is equal to the standard load, the tactile sensation providing unit 13 is not driven in releasing, or if the operator tries to maintain the pressure load at the standard load, the release sensation may be provided unexpectedly, inflicting the feeling of strangeness to the operator. On the other hand, as illustrated in FIG. 17, when the standard load of releasing (second standard) for driving the tactile sensation providing unit 13 is set at any value lower than the standard load of pressing (first standard), the release sensation may be unfailingly provided in releasing. Thereby, the tactile sensation more similar to that of the push-button switch may be provided to the operator more assuredly.

Figure 18:
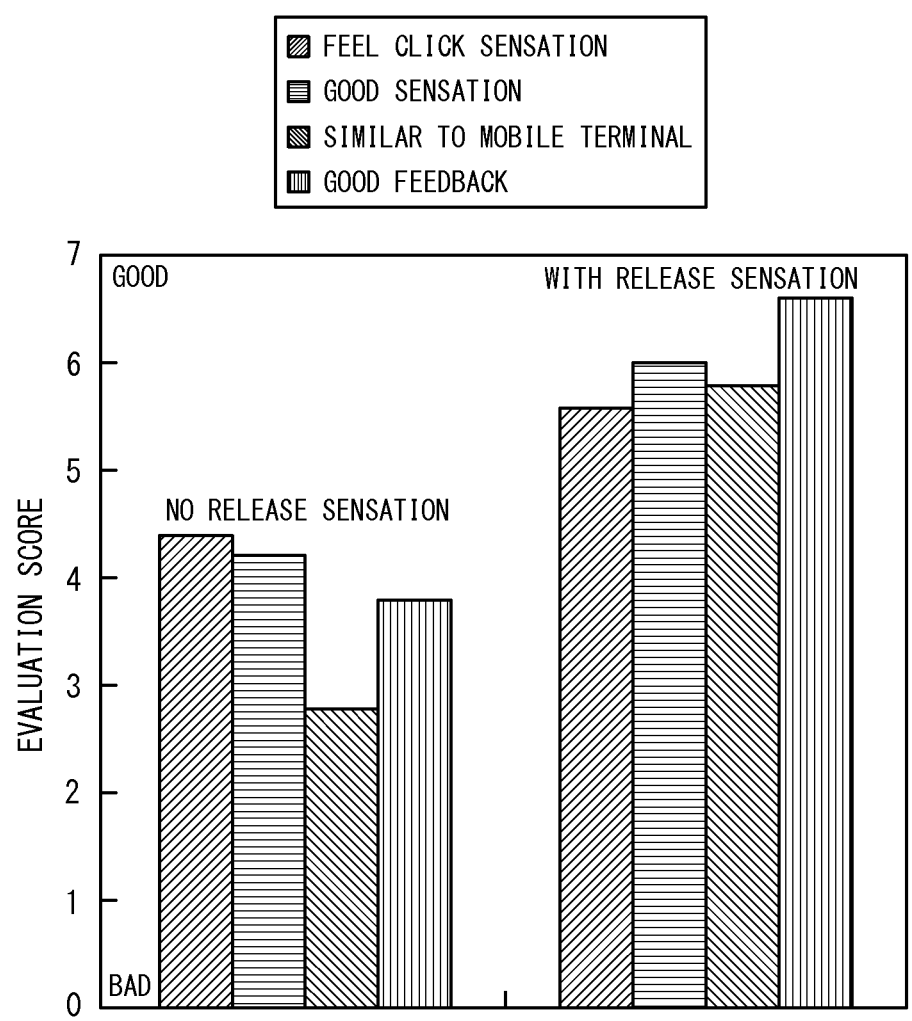
FIG. 18 is a diagram illustrating an example of a result of the sensory evaluation on the click sensation comparing when there is no release sensation and when there is the release sensation.

FIG. 18 is a diagram illustrating a result of the sensory evaluation on when the click sensation alone was provided in releasing and when the click sensation was provided in pressing and also the release sensation was provided in releasing. These sensory evaluations, in the same manner as those described above, were conducted by using the tactile sensation providing apparatus previously suggested by the applicant.

In FIG. 18, bars on the left side represent results of the evaluations when the click sensation alone was provided in pressing, that is, "when there is no release sensation", and bars on the right side represent results of the evaluations when the click sensation was provided in pressing and the release sensation was provided in releasing, that is, "when there is the release sensation". The subjects were the five people involved in the sensory evaluations illustrated in FIG. 2 and FIG. 3. The evaluation was conducted for four items "good feedback (easy to percept)" in addition to the three evaluation items in FIG. 10 to FIG. 13. Each item is on a scale of 1 to 7 and the score of each item represents an average score of the five people. For the item "good feedback", "bad" scores 1 and "good" scores 7. Also, the standard load of pressing for providing the tactile sensation and the standard load of releasing for providing the tactile sensation were set to be equal to each other, and the same drive signal was used for providing these sensations. Here, the standard load for providing the tactile sensation is 1.5 N. Also, the drive signal was the sine wave with the frequency of 170 Hz for one cycle and the amplitude to vibrate the touch sensor by approximately 15 μm under the pressure of 1.5 N.

As can be seen in the result of the evaluation in FIG. 18, when the release sensation is provided by vibrating the touch sensor in releasing in addition to the click sensation, the tactile sensation more similar to that of the push-button switch of the mobile terminal may be obtained, which leads to good feedback (perception).

(Fourth Embodiment)

Incidentally, with the tactile sensation providing apparatus used for the mobile terminal, for example, a so-called repetitive tap to successively input to the same input object is often performed to input a phone number, a message and the like. In such a case, when the touch sensor 11 is vibrated in the predetermined vibration pattern both in pressing and in releasing as illustrated in FIG. 18, the standard load of releasing for providing the tactile sensation needs to be set appropriately.

Figure 19:
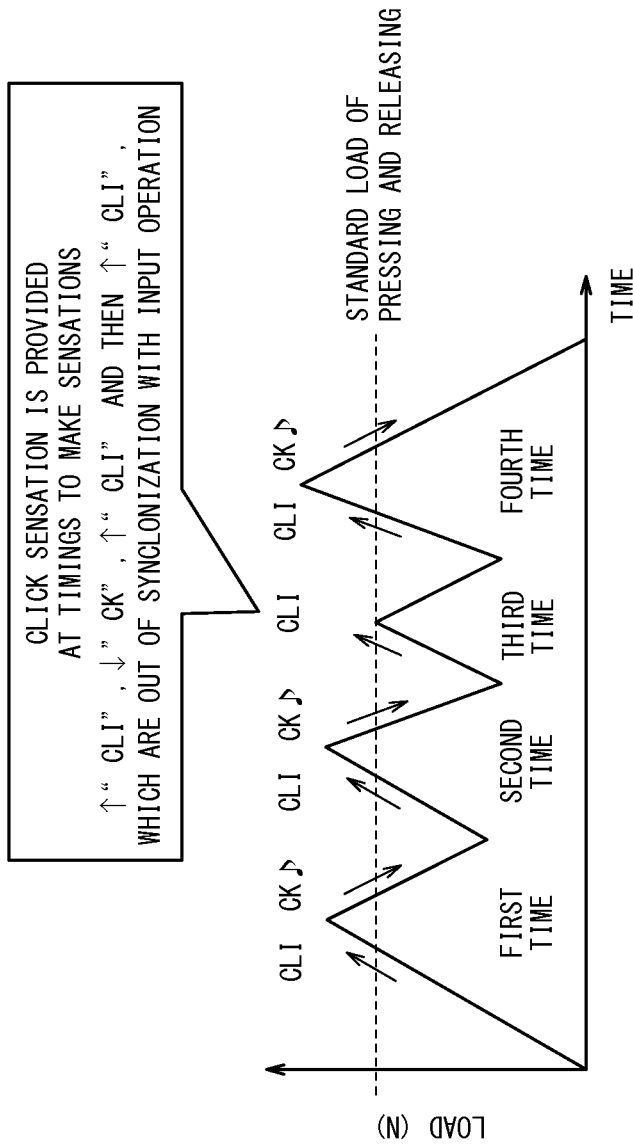
FIG. 19 is a diagram illustrating an example of the tactile sensation provided in successive inputs when the standard load of pressing for providing the tactile sensation and the standard load of releasing for providing the tactile sensation are set to be equal to each other.

That is, when the human quickly performs such successive inputs, a next input is generally started before the pressure load returns to "0" and the maximum load in pressing varies. In this case, when the standard load of pressing for providing the tactile sensation and the standard load of releasing for providing the tactile sensation are set to be equal to each other as described in the third embodiment and the pressure load starts decreasing from the standard load during the successive inputs as illustrated in FIG. 19, the tactile sensation providing unit 13 may not be driven in releasing, or the click sensation of the next input may be provided before the operator thinks that he/she has released the pressure load. As a result, the tactile sensation may not match the input operation, inflicting the feeling of strangeness on the operator. FIG. 19 illustrates a case when a pressure load of a third input in four successive inputs is pulled back from the standard load.

Figure 20:
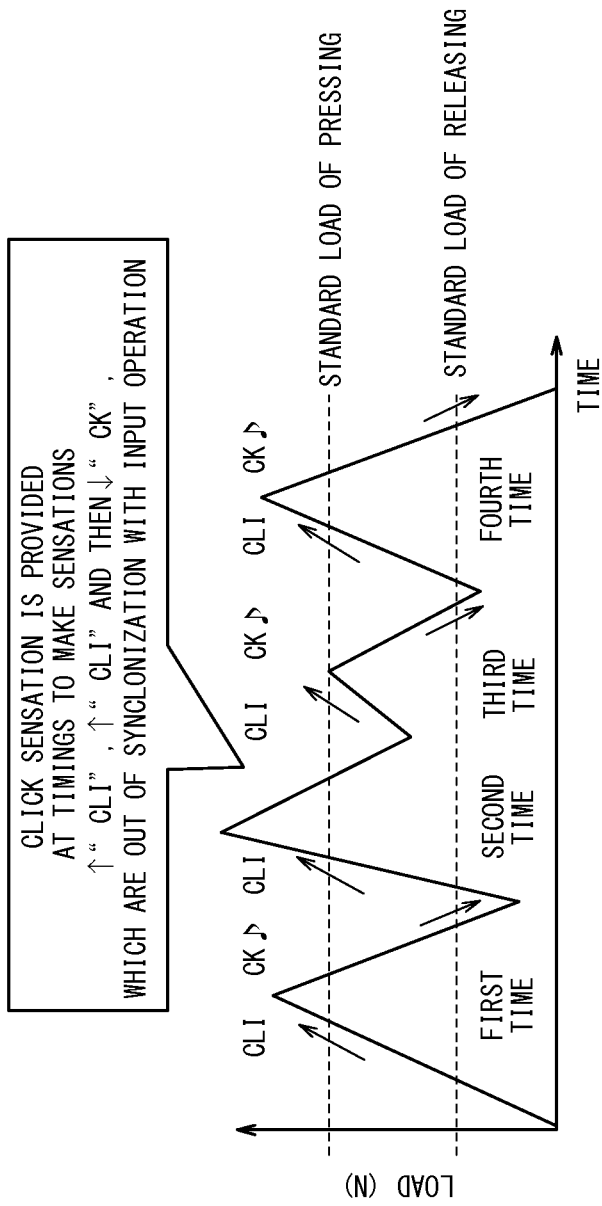
FIG. 20 is a diagram illustrating an example of the tactile sensation provided in successive inputs when the standard load of releasing for providing the tactile sensation is set at a value lower than the standard load of pressing for providing the tactile sensation.

On the other hand, in a case the standard load of releasing for providing the tactile sensation is set at a value too low in comparison to the standard load of pressing for providing the tactile sensation, when a next input operation is performed before the load decreases to the standard load of releasing during the successive inputs as illustrated in FIG. 20, the tactile sensation may be provided out of synchronization, inflicting the feeling of strangeness on the operator. FIG. 20 illustrates a case when a third input in a four repetitive taps is operated before a load of releasing on a second input reaches the standard load of releasing. When the standard load of releasing for providing the tactile sensation is too low as described above, it takes time for the pressure load to return to the standard load. As a result, the operator does not feel the feeling of strangeness by the sensation provided, although it takes time to allow a next input and thus prevents the operator from operating quick successive inputs despite an operator's desire to do so. Accordingly, there is a concern that the operability may be deteriorated in the successive inputs (repetitive tap).

Figure 21:
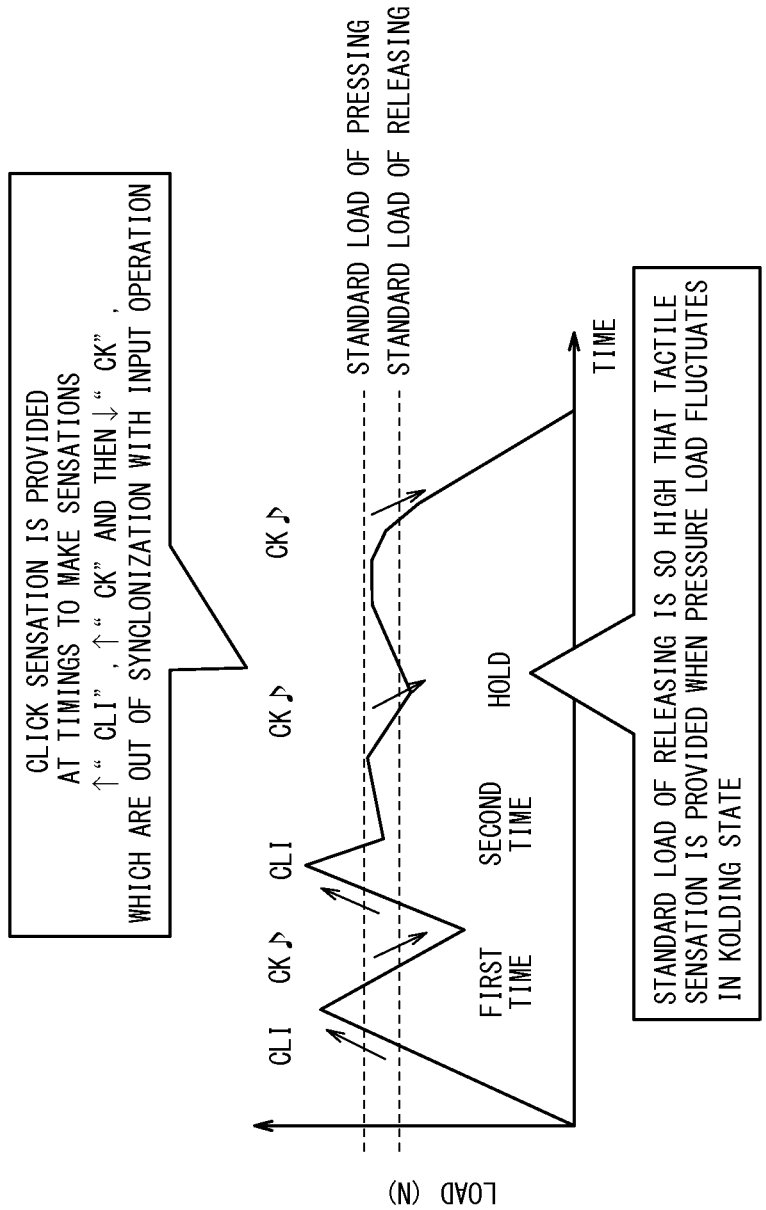
FIG. 21 is a diagram illustrating an example of the tactile sensation provided in successive inputs when the standard load of releasing for providing the tactile sensation is set close to the standard load of pressing for providing the tactile sensation.

On the other hand, when the standard load of releasing for providing the tactile sensation is set close to the standard load of pressing for providing the tactile sensation, quicker successive inputs are enabled. However, when the operator maintains (holds) a pressing state during the successive inputs, the release sensation may be provided unexpectedly to the operator, inflicting the feeling of strangeness. That is, in a holding state maintaining the pressure load during the successive inputs, the load slightly fluctuates despite an operator's intention to maintain a constant pressure load. Therefore, as illustrated in FIG. 21, for example, when a difference between the standard load of pressing and that of releasing is smaller than a load fluctuation range in the holding state described above, the release sensation is provided to the operator despite the operator's intension to maintain the constant pressure load and the feeling of strangeness is inflicted on the operator.

As such, the fourth embodiment of the present invention enables to deal with a faint change in the load in the holding state and to maintain operability during the successive inputs described above, such that the operator may perform the successive inputs smoothly while obtaining the realistic click sensation and release sensation. To that end, using the tactile sensation providing apparatus described in the third embodiment, the standard load of releasing for providing the tactile sensation is set to be in an approximate range of 50-80% of the tactile sensation of pressing for providing the tactile sensation in pressing.

Figure 22:
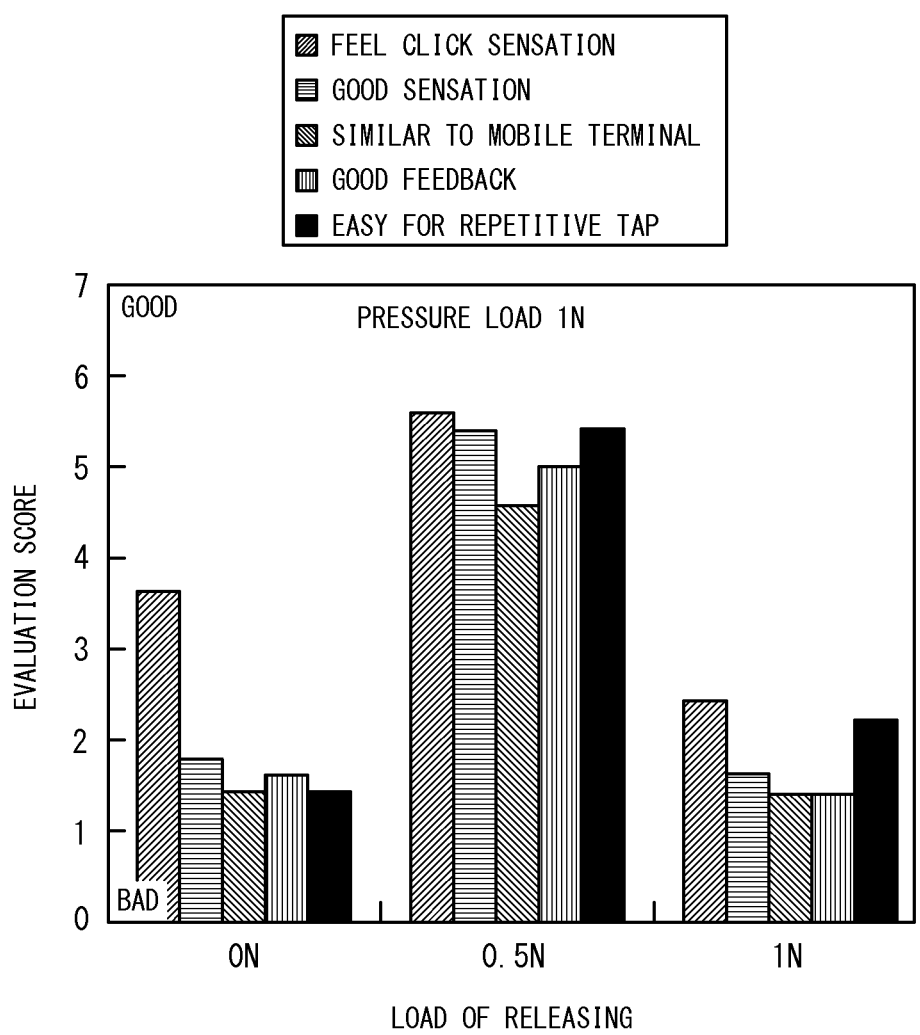
FIG. 22 is a diagram illustrating an example of a result of the sensory evaluation on the tactile sensation in successive inputs when the standard load of pressing for providing the tactile sensation is set to 1 N.
Figure 23:
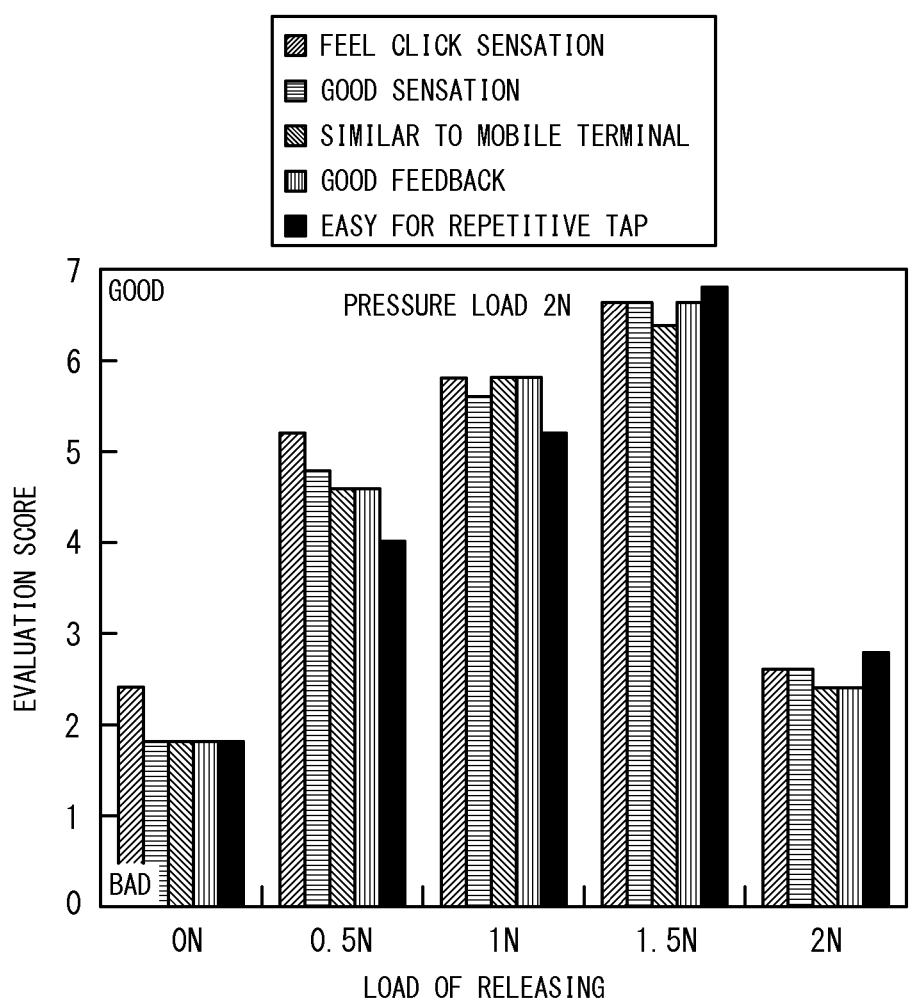
FIG. 23 is a diagram illustrating an example of the result of the sensory evaluation on the tactile sensation in successive inputs when the standard load of pressing for providing the tactile sensation is set to 2 N.
Figure 24:
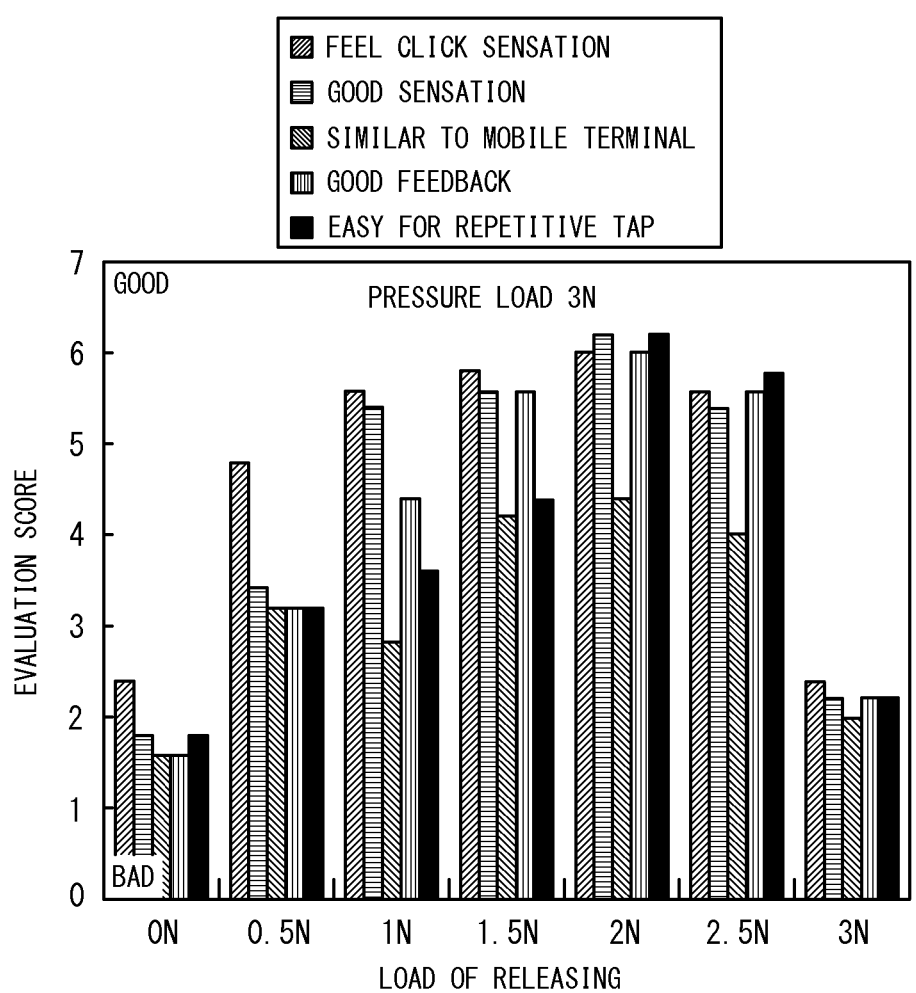
FIG. 24 is a diagram illustrating an example of the result of the sensory evaluation on the tactile sensation in successive inputs when the standard load of pressing for providing the tactile sensation is set to 3 N.

FIGS. 22 to 24 illustrate sensory evaluations of the tactile sensation during the successive inputs (repetitive tap). These sensory evaluations, in the same manner as those described above, were conducted by using the tactile sensation providing apparatus previously suggested by the applicant.

In FIG. 22 to FIG. 24, the subjects are the five people involved in the sensory evaluation illustrated in FIG. 18. The evaluation was conducted for five items including "easy for repetitive tap" in addition to the four items in FIG. 18. Each item is on a scale of 1 to 7 and the score of each item represents an average score of the five people. For the item "easy to perform repetitive tap", "No" scores 1 and "Yes" scores 7. Also, both in pressing and in releasing, the drive signal for driving the vibration unit (corresponding to the tactile sensation providing unit according to the present invention) was the sine wave with the frequency of 170 Hz for 1 cycle and the amplitude for vibrating the touch sensor by approximately 15 μm when the standard load for providing the tactile sensation was satisfied.

FIG. 22 illustrates results of evaluations when the standard load of pressing for providing the tactile sensation in pressing was 1 N and the standard load of releasing for providing the release sensation in releasing was 0 N, 0.5 N and 1 N. As can be seen in FIG. 22, when the standard load of pressing for providing the tactile sensation was 1 N, the highest evaluations for all items were obtained when the standard load of releasing for providing the tactile sensation was 0.5 N.

FIG. 23 illustrates results of evaluations when the standard load of pressing for providing the tactile sensation was 2 N and the standard load of releasing for providing the tactile sensation was 0 N, 0.5 N, 1 N, 1.5 N and 2 N. As can be seen in FIG. 23, when the standard load of pressing for providing the tactile sensation was 2 N, high evaluations were obtained when the standard load of releasing for providing the tactile sensation was 1 N and 1.5 N. The highest evaluations for all items were obtained especially when the standard load of releasing was 1.5 N.

FIG. 24 illustrates results of evaluations when the standard load of pressing for providing the tactile sensation was 3 N and the standard load of releasing for providing the tactile sensation was 0 N, 0.5 N, 1 N, 1.5 N, 2 N, 2.5 N and 3 N. As can be seen in FIG. 24, when the standard load of pressing for providing the tactile sensation was 3 N, high evaluations were obtained when the standard load of releasing for providing the tactile sensation was 1.5 N, 2 N and 2.5 N. The highest evaluations for all items were obtained especially when the standard load of releasing was 2 N.

From the examples of the results of the evaluations set forth above, it was observed that, when the standard load of releasing for providing the tactile sensation is set to a value in the range of approximately 50-80% of the standard load of pressing for providing the tactile sensation, sequential inputs synchronize with timings to provide the tactile sensations during the successive inputs (repetitive tapping), thereby providing the realistic tactile sensation without inflicting the feeling of strangeness. That is, the standard load of releasing for providing the tactile sensation is set to be smaller than the standard load of pressing for providing the tactile sensation, thereby the feeling of strangeness may be prevented. Also, the standard load of releasing for providing the tactile sensation is set to be approximately 50% or more of the standard load of pressing for providing the tactile sensation, thereby the operability during the successive inputs may be significantly improved. Further, the standard load of releasing for providing the tactile sensation is set to be approximately 80% or less than the standard load of pressing for providing the tactile sensation, thereby a faint load change in a holding state may be dealt with during the successive inputs.

According to the fourth embodiment of the present invention also, in consideration of the results of the evaluations set forth above, when the standard load of pressing for providing the tactile sensation is set to 1 N, for example, the standard load of releasing for providing the tactile sensation is set at any value between 0.5 N and 0.8 N. In addition, when the standard load of pressing for providing the tactile sensation is high, the load fluctuation range in the holding state becomes wider than that when the standard load of pressing is low. In such a case also, the standard load of releasing for providing the tactile sensation is set to a value in the range of approximately 50-80% of the standard load of pressing. For example, when the standard load of pressing for providing the tactile sensation is set to 6 N, which is a high value, the standard load of releasing for providing the tactile sensation is set to 3 N-4.8 N. Accordingly, unexpected release sensation is prevented and the realistic click sensation may be provided in synchronization with the successive inputs without the feeling of strangeness. The standard load of pressing for providing the tactile sensation and the standard load of releasing for providing the tactile sensation may be either fixedly set or appropriately set by the user.

It is to be understood that the present invention is not limited to the above embodiment but may be modified or varied in a multiple of manners. For example, the load detection unit may be configured by using any number of strain gauge sensors. Also, the load detection unit may be configured without using the strain gage sensor when capable of detecting a load in accordance with an input detection type of the touch sensor; that is, for example, when the touch sensor of the resistive film type may detect a load from a change of an output signal based on a resistance change in accordance with a contact area, or when the touch sensor of the capacitive type may detect a load based on a change in capacitance. Moreover, the tactile sensation providing unit may be configured by using any number of piezoelectric vibrators, transparent piezoelectric elements provided on an entire surface of the touch sensor, or an eccentric motor which rotates 360 degrees in 1 cycle of the drive signal. Further, the load detection unit and the tactile sensation providing unit may share the piezoelectric elements when both units are configured by using the piezoelectric elements.

Also, the control unit may be configured to change the drive signal for driving the tactile sensation providing unit based on an input position detected by the touch sensor such that different click sensations are provided.

The present invention is effectively applicable to the tactile sensation providing apparatus having the touch sensor serves as a touch switch for performing on/off operations. Also, the tactile sensation providing apparatus according to the present invention is capable of providing feelings of a multistep switch, such as a two-step switch (pressed further after pressed), by sequentially providing the tactile sensation on different standards (loads) while the touch sensor is being pressed. Thereby, when being applied to a release button of a camera, for example, the tactile sensation providing apparatus may provide a feeling to lock focus (first step) and a feeling to release (second step) one time at each step. Moreover, in combination with the display unit, the tactile sensation providing apparatus enables to change a display of a menu panel and the like in a variety of manners in accordance with the step. Further, when providing the feelings of the multistep switch, the drive signal for vibrating the touch face by the tactile sensation providing unit may be changed at each step such that a different click sensation is provided one time at each step. Also, the drive signal for the tactile sensation providing unit may be changed according to the input object. When the drive signal is changed as described above, various drive signal information is stored in the memory unit and necessary drive signal information is retrieved for providing the tactile sensation.

According to the tactile sensation providing apparatus of the present invention, when the pressure load detected by the load detection unit satisfies the standard load for providing the tactile sensation, the tactile sensation providing unit is driven one time. Here, "when the pressure load detected by the load detection unit satisfies the standard load" may represent "when the pressure load detected by the load detection unit reaches a standard value for providing the tactile sensation", "when the pressure load detected by the load detection unit exceeds the standard value for providing the tactile sensation", or "when the standard value for providing the tactile sensation is detected by the load detection unit".

Further, when the pressure load detected by the load detection unit satisfies the standard load for providing the tactile sensation, the control unit drives the tactile sensation providing unit one time to vibrate the touch sensor in the predetermined vibration pattern. The predetermined vibration pattern in pressing may be a vibration pattern indicated by a solid line in FIG. 4. Also, the predetermined vibration pattern in pressing may be a vibration pattern indicated by a dashed line in FIG. 4. When the touch sensor is vibrated in these manners, the tactile sensation (vibration stimulus) similar to that obtained when operating the push-button switch may be provided to the operator.

REFERENCE SIGNS LIST 11 touch sensor
11a touch face
12 load detection unit
13 tactile sensation providing unit
14 display unit
15 memory unit
16 control unit
21 housing
22 insulator
23 upper cover
24 insulator
31 strain gauge sensor
32 piezoelectric vibrator
41 touch sensor
41a input object
43 display unit
44 load detection unit
45 tactile sensation providing unit
46 memory unit
47 control unit

The invention claimed is:

1. A tactile sensation providing apparatus comprising:
a touch sensor configured to receive an input;
a load detection unit configured to detect a pressure load on a touch face of the touch sensor;
a tactile sensation providing unit configured to provide a tactile sensation on the touch face;
a memory unit configured to store drive signal information for the tactile sensation providing unit; and
a controller configured, to control drive of the tactile sensation providing unit, wherein
when a pressure load lower than a standard load of pressing is detected by the load detection unit, a pressure sense is stimulated by the pressure load applied to the touch face and detected by the load detection unit,
when a pressure load satisfying the standard load of pressing is detected by the load detection unit, a tactile sense is stimulated by the tactile sensation providing unit on the basis of the drive signal information stored in the memory unit,
when a pressure load that decreases across a standard load of releasing, which is lower than the standard load of pressing, is detected by the load detection unit, after the tactile sense is stimulated by the tactile sensation providing unit, a release sensation is stimulated by the tactile sensation providing unit on the basis of the drive signal information stored in the memory unit, and
the drive signal information includes information specifying that the tactile sense is stimulated for a maximum of 5/4 cycles in a frequency range of 140-200 Hz and that the release sensation is stimulated for approximately one cycle at a frequency of approximately 125 Hz.

2. The tactile sensation providing apparatus of claim 1, wherein the tactile sensation providing unit, in response to the pressure load, provides the tactile sensation which is a same familiar downward motion of a button.

3. The tactile sensation providing apparatus of claim 1, wherein the drive signal information for the tactile sense and the drive signal information for the release sensation are different.

4. The tactile sensation providing apparatus of claim 1, wherein the drive signal information includes information specifying one or more of a frequency, a cycle, a waveform, and amplitude for stimulating the tactile sense and the release sensation.

5. A control method for a tactile sensation providing apparatus including
a touch sensor configured to receive an input;
a load detection unit configured to detect a pressure load on a touch face of the touch sensor;
a tactile sensation providing unit configured to provide a tactile sensation on the touch face; and
a memory unit configured to store drive signal information for the tactile sensation providing unit,
the method comprising:
controlling drive of the tactile sensation providing unit in response to the pressure load, wherein
when a pressure load lower than a standard load of pressing is detected by the load detection unit, a pressure sense is stimulated by the pressure load applied to the touch face and detected by the load detection unit,
when a pressure load satisfying the standard load of pressing is detected by the load detection unit, a tactile sense is stimulated by the tactile sensation providing unit on the basis of the drive signal information stored in the memory unit,
when a pressure load that decreases across a standard load of releasing, which is lower than the standard load of pressing, is detected by the load detection unit, after the tactile sense is stimulated by the tactile sensation providing unit, a release sensation is stimulated by the tactile sensation providing unit on the basis of the drive signal information stored in the memory unit, and
the drive signal information includes information specifying that the tactile sense is stimulated for a maximum of 5/4 cycles in a frequency range of 140-200 Hz and that the release sensation is stimulated for approximately one cycle at a frequency of approximately 125 Hz.

6. The control method for a tactile sensation providing apparatus of claim 5, wherein the tactile sensation providing unit, in response to the pressure load, provides the tactile sensation which is a same familiar downward motion of a button.

7. The control method for a tactile sensation providing apparatus of claim 5, wherein the drive signal information for the tactile sense and the drive signal information for the release sensation are different.

8. The control method for a tactile sensation providing apparatus of claim 5, wherein the drive signal information includes information specifying one or more of a frequency, a cycle, a waveform, and amplitude for stimulating the tactile sense and the release sensation.

9. A tactile sensation providing apparatus comprising:
   a touch sensor configured to receive an input;
   a unit configured to detect a pressure load on a touch face of the touch sensor, to provide a tactile sensation on the touch face;
   a memory unit configured to store drive signal information for the unit; and
   a controller configured to control drive of the unit in response to the pressure load, wherein
   when a pressure load lower than a standard load of pressing is detected by the unit, a pressure sense is stimulated by the pressure load applied to the touch face and detected by the unit,
   when a pressure load satisfying the standard load of pressing is detected by the unit, a tactile sense is stimulated by the unit on the basis of the drive signal information stored in the memory unit,
   when a pressure load that decreases across a standard load of releasing, which is lower than the standard load of pressing, is detected by the unit, after the tactile sense is stimulated by the unit, a release sensation is stimulated by the unit on the basis of the drive signal information stored in the memory unit, and
   the drive signal information includes information specifying that the tactile sense is stimulated for a maximum of 5/4 cycles in a frequency range of 140-200 Hz and that the release sensation is stimulated for approximately one cycle at a frequency of approximately 125 Hz.

10. The tactile sensation providing apparatus of claim 9, wherein the unit, in response to the pressure load, provides the tactile sensation which is a same familiar downward motion of a button.

11. The tactile sensation providing apparatus of claim 9, wherein the drive signal information for the tactile sense and the drive signal information for the release sensation are different.

12. The tactile sensation providing apparatus of claim 9, wherein the drive signal information includes information specifying one or more of a frequency, a cycle, a waveform, and amplitude for stimulating the tactile sense and the release sensation.

13. A control method for a tactile sensation providing apparatus including
   a touch sensor configured to receive an input;
   a unit configured to detect a pressure load on a touch face of the touch sensor, to provide a tactile sensation on the touch face; and
   a memory unit configured to store drive signal information for the tactile sensation providing unit,
   the method comprising:
   controlling drive of the unit in response to the pressure load, wherein
   when a pressure load lower than a standard load of pressing is detected by the unit, a pressure sense is stimulated by the pressure load applied to the touch face and detected by the unit,
   when a pressure load satisfying the standard load of pressing is detected by the unit, a tactile sense is stimulated by the unit on the basis of the drive signal information stored in the memory unit,
   when a pressure load that decreases across a standard load of releasing, which is lower than the standard load of pressing, is detected by the unit, after the tactile sense is stimulated by the unit, a release sensation is stimulated by the unit on the basis of the drive signal information stored in the memory unit, and
   the drive signal information includes information specifying that the tactile sense is stimulated for a maximum of 5/4 cycles in a frequency range of 140-200 Hz and that the release sensation is stimulated for approximately one cycle at a frequency of approximately 125 Hz.

14. The control method for a tactile sensation providing apparatus of claim 13, wherein the unit, in response to the pressure load, provides the tactile sensation which is a same familiar downward motion of a button.

15. The control method for a tactile sensation providing apparatus of claim 13, wherein the drive signal information for the tactile sense and the drive signal information for the release sensation are different.

16. The control method for a tactile sensation providing apparatus of claim 13, wherein the drive signal information includes information specifying one or more of a frequency, a cycle, a waveform, and amplitude for stimulating the tactile sense and the release sensation.

* * * * *